United States Patent
Shao et al.

(10) Patent No.: US 12,512,658 B2
(45) Date of Patent: Dec. 30, 2025

(54) DEVICE HAVING A RATE OF CURRENT CHANGE LIMITER AND PROCESS OF IMPLEMENTING THE SAME

(71) Applicant: WOLFSPEED, INC., Durham, NC (US)

(72) Inventors: Jianwen Shao, Cary, NC (US); Ajit Kanale, Raleigh, NC (US); Prasanna Obala Bhuvanesh, Leander, TX (US)

(73) Assignee: Wolfspeed, Inc., Durham, NC (US)

( * ) Notice: Subject to any disclaimer, the term of this patent is extended or adjusted under 35 U.S.C. 154(b) by 224 days.

(21) Appl. No.: 18/396,593

(22) Filed: Dec. 26, 2023

(65) Prior Publication Data

US 2025/0210962 A1 Jun. 26, 2025

(51) Int. Cl.
*H02H 3/08* (2006.01)
*H02H 1/00* (2006.01)

(52) U.S. Cl.
CPC .......... *H02H 3/08* (2013.01); *H02H 1/0007* (2013.01)

(58) Field of Classification Search
CPC .............................. H02H 1/0007; H02H 3/08
USPC .......................................................... 361/93.1
See application file for complete search history.

(56) References Cited

U.S. PATENT DOCUMENTS

| | | | |
|---|---|---|---|
| 7,821,243 B2* | 10/2010 | Shiraishi | H03K 17/6871 323/282 |
| 11,722,130 B1* | 8/2023 | Tran | H03K 17/165 361/93.1 |
| 2023/0187922 A1* | 6/2023 | Randazzo | H02H 5/048 361/87 |

FOREIGN PATENT DOCUMENTS

CN 112564031 A * 3/2021 ............ G01R 19/00

OTHER PUBLICATIONS

Machine translation of Kempitiya Chinese Patent Document CN 112564031 A Mar. 2021 (Year: 2021).*

* cited by examiner

*Primary Examiner* — Kevin J Comber
(74) *Attorney, Agent, or Firm* — BakerHostetler

(57) ABSTRACT

A device may include at least one power device; a gate driver; a control and sensing circuit; and a current sensor. Also, the device may include a current limiter that includes a parasitic inductance component. The parasitic inductance component is configured, structured, and/or implemented to limit a rate of current change (di/dt) during a fault. In addition, the device may be configured to be implemented in a system that includes a load and a power source.

58 Claims, 11 Drawing Sheets

DEVICE HAVING A RATE OF CURRENT CHANGE LIMITER AND PROCESS OF IMPLEMENTING THE SAME

FIELD OF THE DISCLOSURE

The disclosure relates to a device having a rate of current change limiter. Further, the disclosure relates to a process of implementing a device having a rate of current change limiter for a solid state circuit breaker. The disclosure further relates to a rate of current change limiter for a solid state circuit breaker. Further, the disclosure additionally relates to a process of implementing a rate of current change limiter for a solid state circuit breaker.

BACKGROUND OF THE DISCLOSURE

A circuit breaker is typically an electrical safety device designed to protect components, such as an electrical circuit, devices, equipment, and/or the like from damage caused by overcurrent. A typical circuit breaker interrupts current flow to protect the components. Solid-state circuit breakers, also known as digital circuit breakers, implement electrical circuit breaker technology. In this regard, it is highly beneficial for solid-state circuit breakers to switch-off under an occurrence of a fault current. More specifically, a fault current can be very high, which causes prohibitive power dissipation in a switch of a solid-state circuit breaker, and stores a large amount of inductive energy in cables, inductors, coil-based equipment, such as motors, generators, other components, and/or the like. A large energy buildup in inductive energy results in avalanche energy stress on components of a solid-state circuit breaker, such as a power device, eventually causing failure. Existing systems rely on sensing circuits to detect and shut-off fault currents. However, a duration of time from fault to fault detection and breaker shut-off is of the order of microseconds, which could still lead to very high current for components of a solid-state circuit breaker, such as power devices.

Accordingly, a solid-state circuit breaker configured to limit a current and/or a rate of current change during a fault event is needed.

SUMMARY OF THE DISCLOSURE

The foregoing needs are met, to a great extent, by the disclosure, wherein in one aspect a solid state circuit breaker and solid state circuit breaker process are provided to limit a current and/or a rate of current change during a fault event.

In one aspect, a device includes at least one power device. The device in addition includes a gate driver. The device moreover includes a control and sensing circuit. The device also includes a current sensor. The device further includes a current limiter that includes a parasitic inductance component. The device in addition includes where the parasitic inductance component is configured, structured, and/or implemented to limit a rate of current change (di/dt) during a fault. The device moreover includes where the device is configured to be implemented in a system that includes a load and a power source.

In one aspect, a process implementing a device includes providing at least one power device. The process in addition includes providing a gate driver. The process moreover includes providing a control and sensing circuit. The process also includes providing a current sensor. The process further includes providing a current limiter that includes a parasitic inductance component. The process in addition includes configuring the parasitic inductance component to limit a rate of current change (di/dt) during a fault. The process moreover includes where the device is configured to be implemented in a system that includes a load and a power source.

In one aspect, a device includes at least one power device. The device in addition includes a gate driver. The breaker moreover includes a control and sensing circuit. The breaker also includes a current sensor. The breaker further includes a current limiter that comprises a parasitic inductance component configured, to increase parasitic inductance in a gate drive of the at least one power device. The breaker in addition includes where the device is configured to be implemented in a system that comprises a load and a power source.

In one aspect, a process includes providing at least one power device. The process in addition includes providing a gate driver. The process moreover includes providing a control and sensing circuit. The process also includes providing a current sensor. The process further includes providing a current limiter that comprises a parasitic inductance component configured, to increase parasitic inductance in a gate drive of the at least one power device. The process in addition includes where the device is configured to be implemented in a system that comprises a load and a power source.

In one aspect, a device includes at least one power device. The device in addition includes a gate driver. The breaker moreover includes a control and sensing circuit. The breaker also includes a current sensor. The breaker further includes a current limiter that comprises a parasitic inductance component configured to reduce a likelihood of damage to circuits, devices, and/or components of the device. The breaker in addition includes where the device is configured to be implemented in a system that comprises a load and a power source.

In one aspect, a process includes providing at least one power device. The process in addition includes providing a gate driver. The process moreover includes providing a control and sensing circuit. The process also includes providing a current sensor. The process further includes providing a current limiter that comprises a parasitic inductance component configured to reduce a likelihood of damage to circuits, devices, and/or components of the device. The process in addition includes where the device is configured to be implemented in a system that comprises a load and a power source.

In one aspect, a device includes at least one power device. The device in addition includes a gate driver. The breaker moreover includes a control and sensing circuit. The breaker also includes a current sensor. The breaker further includes a current limiter that comprises a parasitic inductance component configured to limit a current within and/or limit a rate of current change (di/dt) within the device. The breaker in addition includes where the device is configured to be implemented in a system that comprises a load and a power source.

In one aspect, a process includes providing at least one power device. The process in addition includes providing a gate driver. The process moreover includes providing a control and sensing circuit. The process also includes providing a current sensor. The process further includes providing a current limiter that comprises a parasitic inductance component configured to limit a current within and/or limit a rate of current change (di/dt) within the device. The process in addition includes where the device is configured to be implemented in a system that comprises a load and a power source.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
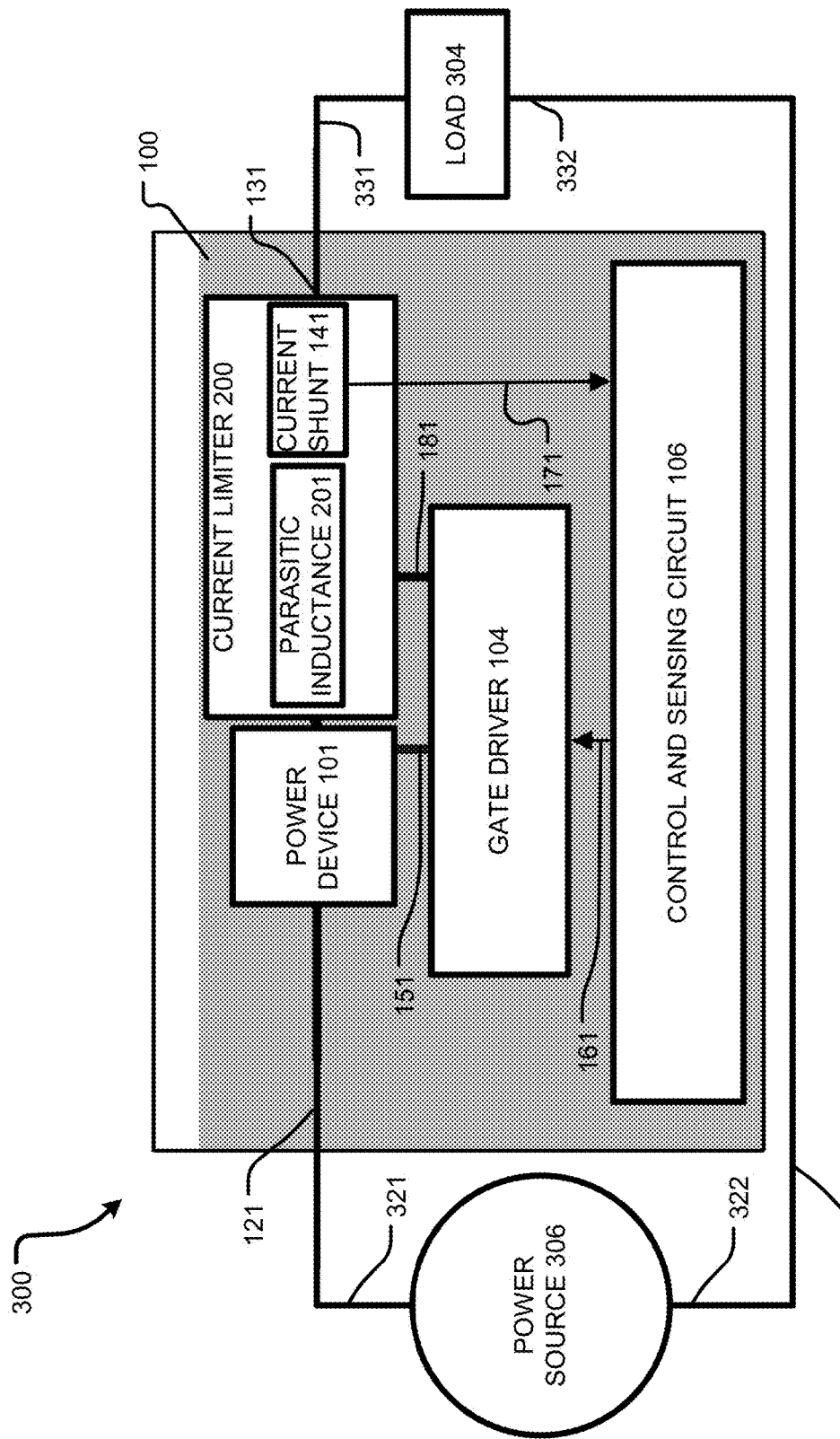
FIG. 1 illustrates a schematic of a system implementing a solid-state circuit breaker according to aspects of the disclosure.

The disclosure will now be described with reference to the drawing figures, in which like reference numerals refer to like parts throughout. Aspects of the disclosure advantageously provide a solid state circuit breaker and solid state circuit breaker process configured to limit a current and/or a rate of current change during a fault event.

Solid-State Circuit Breakers need to switch-off under the occurrence of a fault. Fault current can be very high, which causes prohibitive power dissipation in the switch, and stores a large amount of inductive energy in cables, inductors and coil-based equipment (motors, generators, etc.). A large energy buildup in inductive energy results in avalanche energy stress on the power device, eventually causing failure. Existing systems rely on sensing circuits to detect and shut-off fault currents. However, the duration of detection and shut-off is of the order of microseconds, which could still lead to very high current for solid state power devices.

The disclosed device and process may implement an intentional trace inductance to be included in a gate drive of a power device. This element impedes the current buildup (limits di/dt) and significantly reduces the stress of the power device. Typically, switching circuits strive to minimize such trace inductances to achieve high switching frequencies. However, applications such as solid-state circuit breakers as disclosed can gainfully use trace parasitic inductance as a di/dt limiter to safely shut-off downstream circuits as well as ensure continued, reliable operation of the power device. The trace inductance in the gate drive develops a voltage that reduces the actual device gate voltage under fault conditions, resulting in lower di/dt.

Contemporary circuits rely on fast current sensors that detect fault currents and employ multi-stage gate drivers with soft-shut off capabilities to turn-off a semiconductor switch. These components do not control di/dt on the semiconductor switch. As mentioned above, trace inductances are considered system parasitics and are methodically minimized during design. Implementations of current limiters have employed a series shunt after the source terminal of the power switch. While this limits di/dt during faults, it also adds to the system inductance and results in reduction of avalanche stress on the power device after turn-off.

The disclosure intentionally employs a trace inductance in the gate drive loop that can internally suppress the gate voltage appearing on the semiconductor switch and limit di/dt under fault conditions. Creating a circuit board with an intentional trace inductance has limited cost overhead compared to a board free of parasitics.

Aspects of the disclosure implement a parasitic inductance in the gate drive loop. In a typical switching gate drive loop, configurations are implemented to minimize the loop inductance. In aspects of the disclosure, devices may be purposely configured to increase parasitic inductance in the loop to limit fault di/dt, even normal turn-on di/dt. This parasitic inductor can be the current shunt itself, a separate PCB trace, a copper plate, and/or the like.

In a normal condition, the voltage drop across the inductor is negligible. But during a fault condition, there is sudden high di/dt, the voltage drop across the inductor will counter the gate voltage. The gate voltage: $V_{gs}=V_{gs\_normal}-L*di/dt$; and the drain current=$V_{gs}$*transconductance. So, $V_{gs}$ may be reduced automatically under faulty condition without any other intervention. The inductance is <100 nH, so it is possible to implement with a PCB trace or integrated with current shunt. There may be no additional component.

FIG. 1 illustrates a schematic of a system implementing a solid-state circuit breaker according to aspects of the disclosure.

Figure 2:
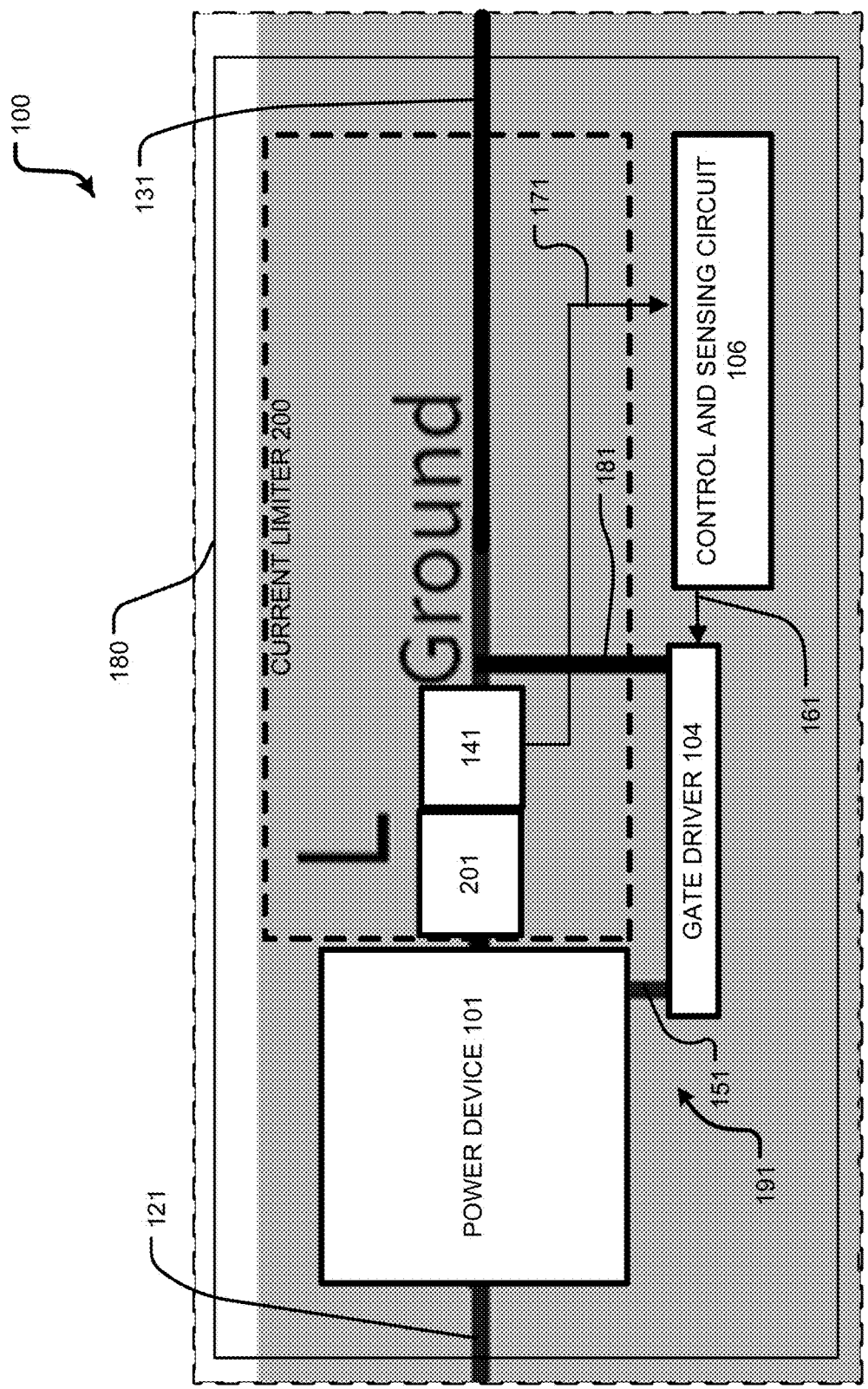
FIG. 2 illustrates an implementation of the solid-state circuit breaker according to FIG. 1.

FIG. 2 illustrates an implementation of the solid-state circuit breaker according to FIG. 1.

Figure 3:
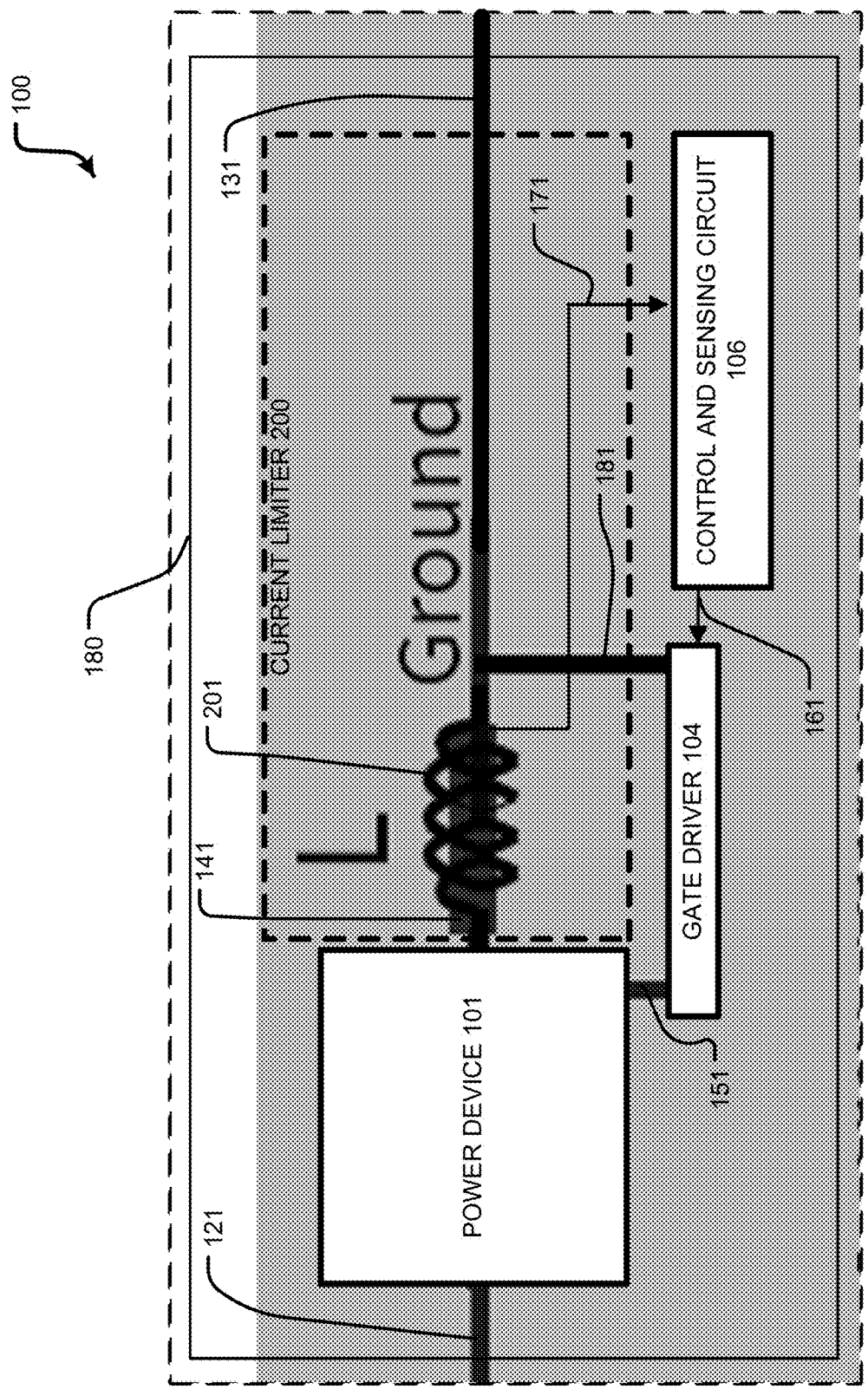
FIG. 3 illustrates another implementation of the solid-state circuit breaker according to FIG. 1.

FIG. 3 illustrates another implementation of the solid-state circuit breaker according to FIG. 1.

Figure 4:
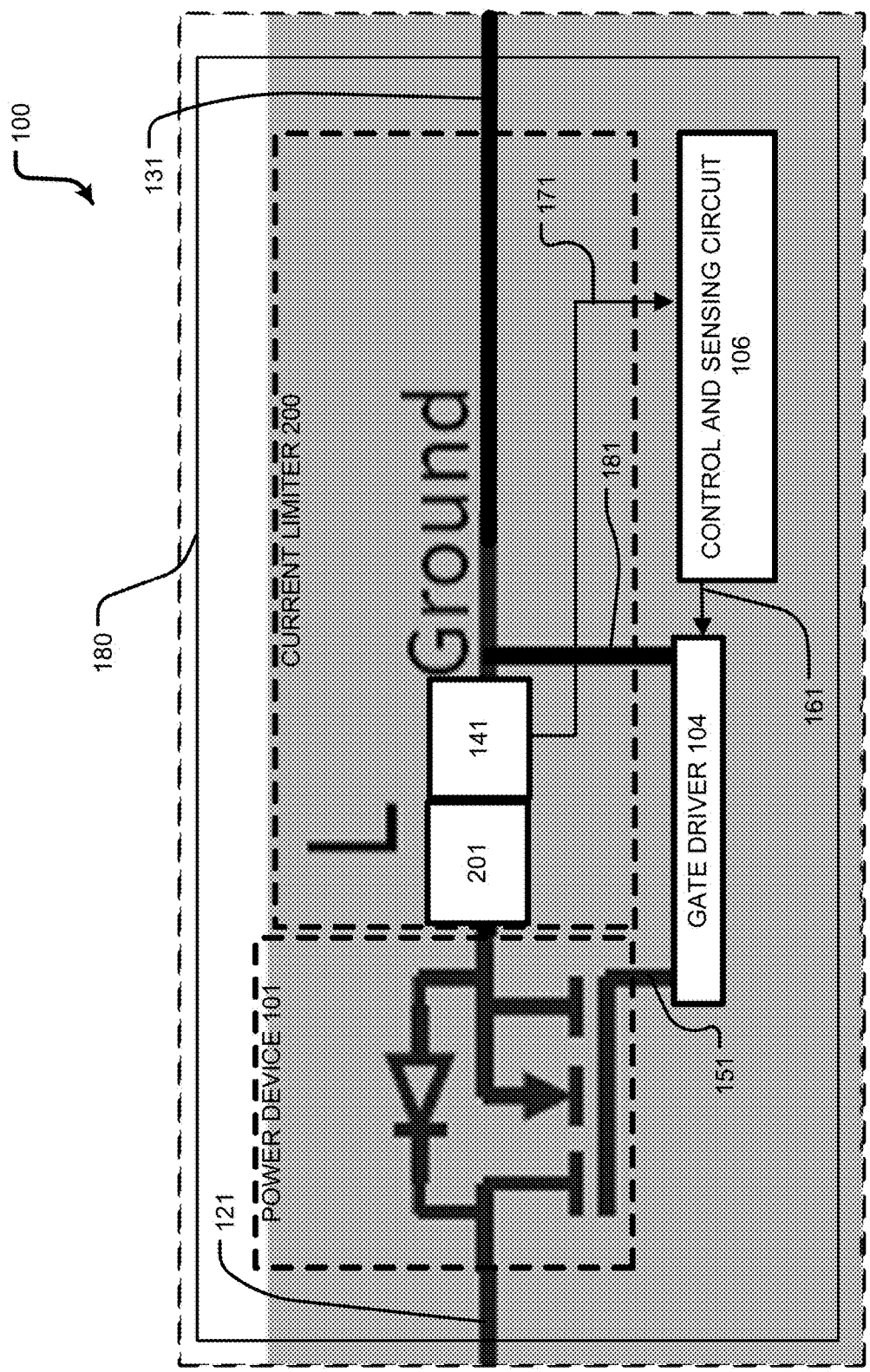
FIG. 4 illustrates another implementation of the solid-state circuit breaker according to FIG. 1.

FIG. 4 illustrates another implementation of the solid-state circuit breaker according to FIG. 1.

In particular, FIG. 1 illustrates a system 300 implementing a solid state circuit breaker 100. In aspects, the solid state circuit breaker 100 may be configured as a uni-directional implementation of the solid state circuit breaker 100. Further, the solid state circuit breaker 100 may include at least one power device 101, a gate driver 104, a control and sensing circuit 106, a current limiter 200, a current sensor 141, a support 180, and/or the like. Additionally, the current limiter 200 may include a parasitic inductance component 201. In aspects, the parasitic inductance component 201 may be a component, an element, and/or the like. The system 300 may include a load 304, a power source 306, and/or the like. The power source 306 may be a DC power source. However, the system 300 of FIG. 1 may alternatively implement an AC power source. In aspects, the solid state circuit breaker 100 may implement the parasitic inductance component 201 as an intentional trace inductance to be included in a gate drive of the at least one power device 101. The parasitic inductance component 201 may be configured to impede a current buildup and/or limit a rate of current change (di/dt) and significantly reduce the stress of the at least one power device 101 and/or other components of the solid state circuit breaker 100. In aspects, the parasitic inductance component 201, which may be implemented as a trace inductance, in the gate drive develops a voltage that reduces gate voltage of the at least one power device 101 under fault conditions, resulting in lower rate of current change (di/dt). In aspects, the parasitic inductance component 201 may employ a trace inductance in the gate drive loop that can internally suppress the gate voltage appearing on the at least one power device 101 and limit a rate of current change (di/dt) di/under fault conditions.

In aspects, the current limiter 200 and/or the parasitic inductance component 201 may be implemented in a gate loop drive of the solid state circuit breaker 100 and/or the at least one power device 101. In a typical switching of a gate drive loop, typical implementations attempt to minimize the gate drive loop inductance. In aspects, the solid state circuit breaker 100 may include the current limiter 200 and/or the parasitic inductance component 201 configured, structured, and/or implemented to purposely increase parasitic inductance in the gate drive loop of the at least one power device 101. In this regard, to purposely increase parasitic inductance in the gate drive loop to limit a rate of current change (di/dt) during a fault. Further, the current limiter 200 and/or the parasitic inductance component 201 may also increase parasitic inductance in the gate drive loop of the at least one power device 101 even during normal turn-on rate of current change (di/dt).

In a normal operating condition of the solid state circuit breaker 100 and/or the system 300, a voltage drop across the parasitic inductance component 201 may be negligible. But during a fault condition of the solid state circuit breaker 100 and/or the system 300, there may be a sudden high rate of current change (di/dt). Accordingly, implementing the current limiter 200 and/or the parasitic inductance component 201 may be configured such that the voltage drop across the parasitic inductance component 201 may counter a gate voltage of the at least one power device 101 of the solid state circuit breaker 100. Accordingly, implementation of the current limiter 200 and/or the parasitic inductance component 201 in the solid state circuit breaker 100 and/or the system 300 may reduce a likelihood of damage to circuits, devices, components, equipment, and/or the like of the solid state circuit breaker 100 including the at least one power device 101.

In aspects, the current sensor 141 may be implemented as a shunt resistor, a current transformer, a Rogowski coil, a magnetic field sensor, a fluxgate sensor, a magneto-resistive current sensor, and/or the like. In particular aspects, the current sensor 141 may be implemented as the shunt resistor. In aspects, the current sensor 141 may be configured to detect an overcurrent within the system 300 and/or 100. Further, the current sensor 141 may be configured to generate an overcurrent signal 171 in response to an overcurrent within the system 300 and/or the solid state circuit breaker 100. In aspects, the current sensor 141 may be arranged anywhere between the power source 306 and the load 304. In aspects, the current sensor 141 may detect a current anywhere between the power source 306 and the load 304.

In aspects, the parasitic inductance component 201 may be configured with a conducting material arranged to generate a parasitic inductance in the solid state circuit breaker 100 and/or the current limiter 200. For example, the parasitic inductance component 201 may be configured as a metallic trace, a metallic plate, a metallic coil, a spiral metallic configuration, and/or the like. Further, the parasitic inductance component 201 may be structured and arranged on a circuit substrate, in or with the current sensor 141, in or on the support 180, such as a printed circuit board (PCB), and/or the like. In aspects, the parasitic inductance component 201 may be part of the current sensor 141 implemented as a current shunt. In aspects, the parasitic inductance component 201 may be the current sensor 141 implemented as a current shunt. In aspects, the parasitic inductance component 201 may be implemented as a trace on the support 180, such as a PCB trace. In aspects, the parasitic inductance component 201 may be implemented as a copper plate. In aspects, the parasitic inductance component 201 may have an inductance of less than 100 nH (nanohenry), 90 nH, 80 nH, 60 nH, 50 nH, 40 nH, 30 nH, 20 nH, 10 nH, or 5 nH. In aspects, the parasitic inductance component 201 may have an inductance of 5 nH to 100 nH, 5 nH to 10 nH, 10 nH to 20 nH, 20 nH to 30 nH, 30 nH to 40 nH, 40 nH to 50 nH, 50 nH to 60 nH, 60 nH to 70 nH, 70 nH to 80 nH, 80 nH to 90 nH, or 90 nH to 100 nH. In other aspects, the parasitic inductance component 201 may have an inductance of greater than 100 nH.

In aspects, during normal operation, the solid state circuit breaker 100 may electrically connect the power source 306 to the load 304. Accordingly, the solid state circuit breaker 100 may provide power from the power source 306 to the load 304 during normal operation.

In aspects, during a fault operation, the solid state circuit breaker 100 may interrupt current flow between the power source 306 and the load 304. In particular, the solid state circuit breaker 100 may electrically disconnect the power source 306 from the load 304. Accordingly, the solid state circuit breaker 100 may limit overcurrent between the power source 306 and the load 304 and protect the power source 306 and the load 304 from damage. Further, the current limiter 200 together with the parasitic inductance component 201 may limit current and/or limit a rate of current change (di/dt) within the solid state circuit breaker 100 and/or the at least one power device 101 and protect the solid state circuit breaker 100 and/or the at least one power device 101 from damage.

In particular, the current sensor 141 may be configured to sense an overcurrent between the power source 306 and the load 304. The current sensor 141 may configured to generate and provide the overcurrent signal 171 to the control and sensing circuit 106 in response to sensing an overcurrent between the power source 306 and the load 304.

Thereafter, the control and sensing circuit 106 may generate and send a control signal 161 to the gate driver 104 in response to the overcurrent signal 171. In this regard, the control and sensing circuit 106 may be configured to generate the control signal 161 in response to the overcurrent signal 171.

Thereafter, the gate driver 104 may provide a gate drive signal 151 in response to the control signal 161 from the control and sensing circuit 106. In this regard, the gate driver 104 may be configured to generate the gate drive signal 151 in response to the control signal 161.

Thereafter, in response to the gate drive signal 151, the at least one power device 101 may turn off. In this regard, the at least one power device 101 may be configured to turn off in response to the gate drive signal 151.

Turning off the at least one power device 101 may disconnect the power source 306 from the load 304. Moreover, turning off the at least one power device 101 may discontinue delivering power between the power source 306 and the load 304.

As there is a finite amount of time between the current sensor 141 sending the overcurrent signal 171, the control and sensing circuit 106 sending the control signal 161, the gate driver 104 sending the gate drive signal 151, and the at least one power device 101 turning off in response to the gate drive signal 151, the solid state circuit breaker 100 may implement the current limiter 200 and/or the parasitic inductance component 201. In aspects, the current limiter 200 and/or the parasitic inductance component 201 may limit a current within and/or limit a rate of current change (di/dt) within the solid state circuit breaker 100 and prevent damage to components of the solid state circuit breaker 100 including the at least one power device 101 during this finite amount of time.

In aspects, the at least one power device 101 may be implemented and configured with a gate, a source, and a drain. In a normal operation condition, an operation of the system 300 and/or the solid state circuit breaker 100 without a fault, a voltage drop across the parasitic inductance component 201 is negligible. But during a fault operation condition of the system 300 and/or the solid state circuit breaker 100, there is sudden high rate of current change (di/dt) within the solid state circuit breaker 100. However, the voltage drop across the parasitic inductance component 201 may counter the gate voltage of the at least one power device 101.

For example, the at least one power device 101 may have a gate source voltage (Vgs) during normal operation expressed as Vgs_normal. Additionally, the parasitic inductance component 201 may have an inductance expressed as L. Further, a rate of current change in the solid state circuit breaker 100 during a fault condition may be expressed as di/dt. Accordingly, the gate source voltage (Vgs) during a fault condition may be expressed as: Vgs=Vgs_normal−L*di/dt; and a drain current=Vgs*transconductance. So the gate source voltage (Vgs) of the at least one power device 101 may be reduced automatically under a faulty condition without any other intervention. In particular, the inductance L of the parasitic inductance component 201 reduces the gate source voltage (Vgs) during a fault condition. Accordingly, the parasitic inductance component 201 protects components of the solid state circuit breaker 100 including the at least one power device 101.

The solid state circuit breaker 100 may further include a first power source input 121 and a first power load output 131. In aspects, the first power source input 121 may be electrically connected to the at least one power device 101. In aspects, the first power source input 121 may be electrically connected to the at least one power device 101 to provide power to the at least one power device 101 from the power source 306.

In aspects, the first power load output 131 may be electrically connected to the current limiter 200. In aspects, the first power load output 131 may be electrically connected to the current limiter 200 to receive power from the current limiter 200. Additionally, the first power load output 131 may be electrically connected to the load 304 to provide power to the load 304 from the at least one power device 101, the current limiter 200, and/or the power source 306.

Additionally, the solid state circuit breaker 100 may include a second power line 122. In aspects, the second power line 122 may be part of the solid state circuit breaker 100. In aspects, the second power line 122 may include a second power input and a second power output (not shown). In other aspects, the second power line 122 may be implemented separate from the solid state circuit breaker 100.

In aspects, the load 304 may include a first load power input 331 and a second load power input 332. In aspects, the first load power input 331 of the load 304 may receive power from the first power load output 131 of the solid state circuit breaker 100; and the second load power input 332 of the load 304 may receive power from the second power line 122 of the solid state circuit breaker 100.

In aspects, the power source 306 may include a first source power output 321 and a second source power output 322. In aspects, the first source power output 321 of the power source 306 may provide power to the first power source input 121 of the solid state circuit breaker 100; and the second source power output 322 of the power source 306 may provide power to the second power line 122 of the solid state circuit breaker 100.

In aspects, the second power line 122 may receive power from the second source power output 322 of the power source 306; and the second power line 122 may deliver power to the second load power input 332 of the load 304.

In aspects, the at least one power device 101 may be a MOSFET (Metal-Oxide-Semiconductor Field-Effect Transistor), an IGBT (Insulated-Gate Bipolar Transistor), a silicon MOSFET, a silicon IGBT, a silicon carbide (SIC) MOSFET, a silicon carbide IGBT, and/or the like.

Further, the at least one power device 101 may define or may be a power switch. In aspects, a power switch implementation of the at least one power device 101 may be implemented by a single MOSFET, IGBT, silicon MOSFET, silicon IGBT, SiC MOSFET, SiC IGBT, and/or the like. In aspects, a power switch implementation of the at least one power device 101 may be implemented by a single MOSFET.

In aspects, a composite power switch implementation of the at least one power device 101 may be implemented by one or more MOSFETs, IGBTs, silicon MOSFETs, silicon IGBTs, SiC MOSFETs, SiC IGBTs, Junction Field Effect Transistors (JFETs), silicon Junction Field Effect Transistors (JFETs), SiC Junction Field Effect Transistors (JFETs), and/or the like. In aspects, a composite power switch implementation of the at least one power device 101 may be implemented by a cascode of one or more MOSFETs, IGBTs, silicon MOSFETs, silicon IGBTs, SiC MOSFETs, SiC IGBTs, Junction Field Effect Transistors (JFETs), silicon Junction Field Effect Transistors (JFETs), SiC Junction Field Effect Transistors (JFETs), and/or the like. In aspects, a composite power switch implementation of the at least one power device 101 may be implemented by a cascode of a silicon MOSFET and a SiC Junction Field Effect Transistor (JFET), and/or the like.

In aspects, a power switch may implement the at least one power device 101 and the current limiter 200 in non-circuit breaker configurations. In aspects, a power switch may implement the at least one power device 101, the current limiter 200, and/or the gate driver 104 in non-circuit breaker configurations. In this regard, a power switch implementation of the at least one power device 101 and the current limiter 200 may be configured to limit a current and/or a rate of current change during a fault event and potential limit damage to the power switch.

In further aspects, a device may include the at least one power device 101, the gate driver 104, the control and sensing circuit 106, the current limiter 200, the current sensor 141, the support 180, and/or the like as disclosed herein. In particular aspects, the various disclosed configurations of the at least one power device 101 and the current limiter 200 may be implemented in non-circuit breaker configurations. For example, normally-on applications implementing a power device may implement configurations of the at least one power device 101 and the current limiter 200 of the disclosure. Likewise, the various disclosed configurations of the at least one power device 101, the current limiter 200, and/or the gate driver 104 may be implemented in non-circuit breaker configurations. For example, normally-on applications implementing a power device may implement configurations of the at least one power device 101, the current limiter 200, and/or the gate driver 104 of the disclosure.

With reference to FIG. 2, the solid state circuit breaker 100 may implement the parasitic inductance component 201 and the current sensor 141 as separate components. As illustrated in FIG. 2, the parasitic inductance component 201 may be connected to the at least one power device 101 and the current sensor 141. More specifically, the parasitic inductance component 201 may be arranged between the at least one power device 101 and the current sensor 141. Further, the current sensor 141 may connect to the first power load output 131.

In other aspects, the current sensor 141 may be arranged between the at least one power device 101 and the parasitic inductance component 201. Further, the parasitic inductance component 201 may connect to the first power load output 131 (not shown). In other aspects, the current sensor 141 and the parasitic inductance component 201 may be integrated as illustrated in FIG. 3. Accordingly, the parasitic inductance component 201 and the current sensor 141 may connect to the first power load output 131; and the parasitic inductance component 201 and the current sensor 141 may connect to the at least one power device 101.

Additionally, FIG. 2 illustrates that the first power load output 131 may connect along line 181 to the gate driver 104. In aspects, the line 181 may be configured as a ground reference for the gate driver 104. Accordingly, the gate driver 104, the gate drive signal 151, the at least one power device 101, the parasitic inductance component 201, the current sensor 141, the first power load output 131, the line 181, and/or the like may in part form a gate drive loop 191. In this regard, the parasitic inductance component 201 may increase a parasitic inductance in the gate drive loop 191 to limit a rate of current change (di/dt) during a fault. In aspects, the parasitic inductance component 201 may be arranged and/or located anywhere within the gate drive loop 191.

Further, FIG. 2 illustrates that the solid state circuit breaker 100 may include the support 180. In this regard, the support 180 may support any one or more of the at least one power device 101, the first power source input 121, the gate drive loop 191, the line 181, the current sensor 141, the parasitic inductance component 201, the first power load output 131, the current limiter 200, and/or the like. The support 180 may be a printed circuit board (PCB), a substrate, a lead frame, a circuit board, a printed wiring board (PWB), a medium used to connect electronic components to one another in a controlled manner, and/or the like. In aspects, the support 180 may be implemented as a laminated sandwich structure of one or more conductive and insulating layers. In aspects, the support 180 may include one or more conductive layers, traces, planes and/or the like. In aspects, the support 180 may be etched from one or more sheet layers of copper laminated onto and/or between sheet layers of a non-conductive substrate. In aspects, the support 180 may be configured such that one or more of the at least one power device 101, the first power source input 121, the gate drive loop 191, the line 181, the current sensor 141, the parasitic inductance component 201, the first power load output 131, the current limiter 200, and/or other electrical components may be affixed. In aspects, the support 180 may include plated-through holes that allow interconnections between layers.

FIG. 3 illustrates an exemplary implementation of the current sensor 141 and the parasitic inductance component 201. As illustrated in FIG. 3, the current sensor 141 and the parasitic inductance component 201 may be integrated.

FIG. 4 illustrates an exemplary implementation of the at least one power device 101. In this regard, FIG. 4 illustrates the at least one power device 101 may be implemented as a MOSFET having a diode arranged in parallel. In aspects, the at least one power device 101 may be a MOSFET, an IGBT, a silicon MOSFET, a silicon IGBT, a silicon carbide MOSFET, a silicon carbide IGBT, and/or the like.

The aspects of the solid state circuit breaker 100, the current limiter 200, and/or the system 300 illustrated in FIG. 1, FIG. 2, FIG. 3, and FIG. 4 and described therewith may optionally include any of the other aspects of the solid state circuit breaker 100, the current limiter 200, and/or the system 300 described herein.

Figure 5:
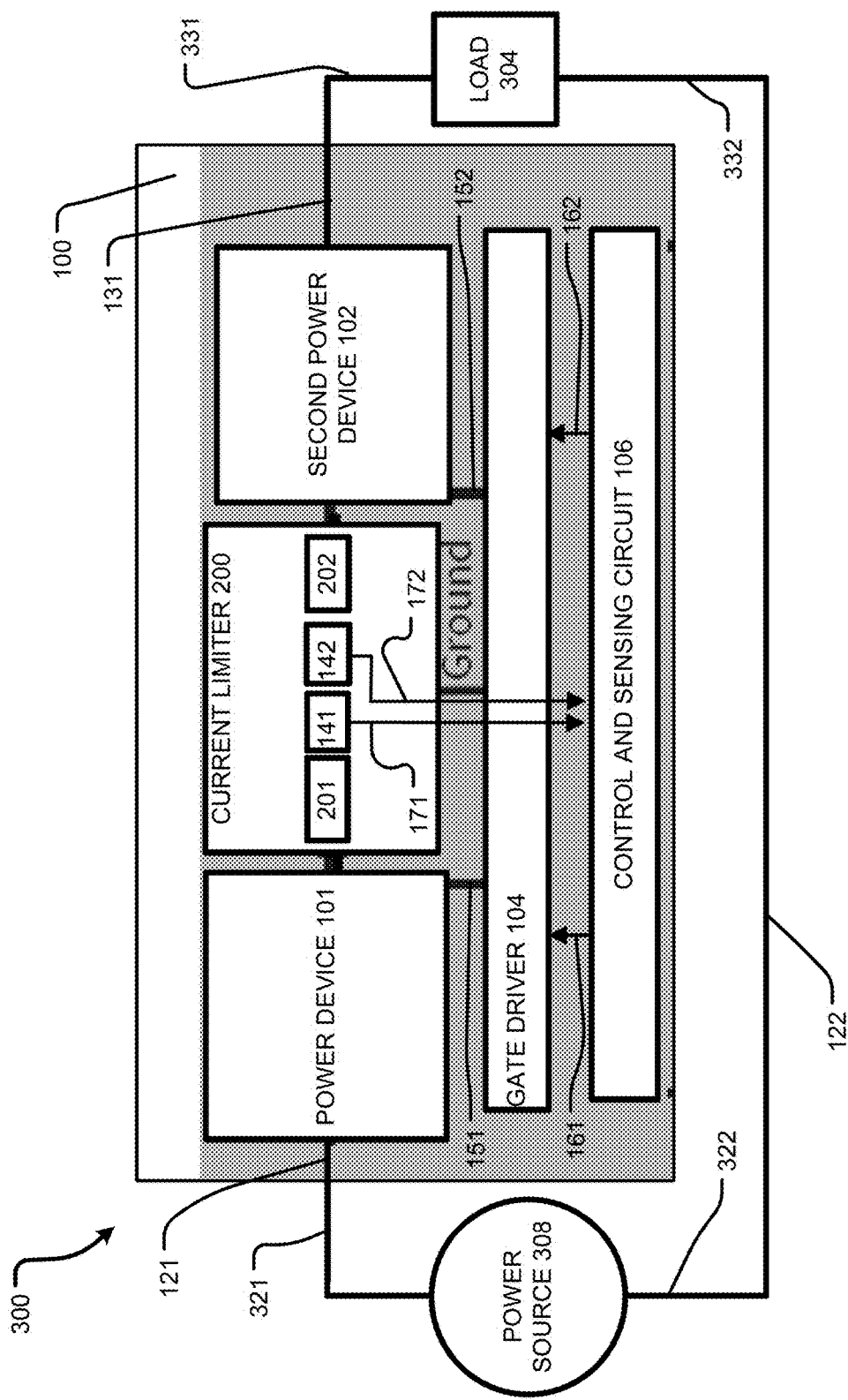
FIG. 5 illustrates a schematic of a system implementing a solid-state circuit breaker according to aspects of the disclosure.

FIG. 5 illustrates a schematic of a system implementing a solid-state circuit breaker according to aspects of the disclosure.

Figure 6:
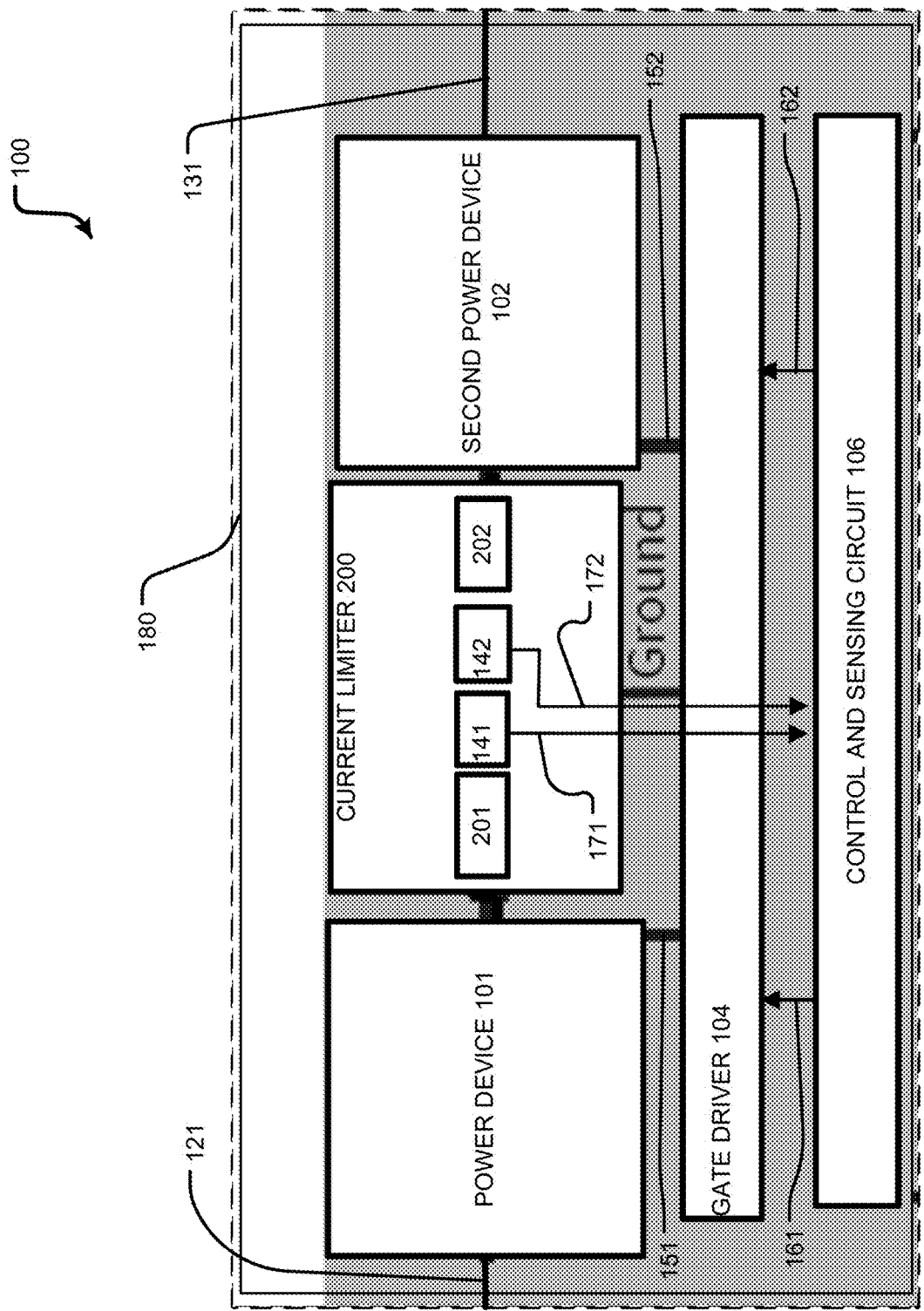
FIG. 6 illustrates an implementation of the solid-state circuit breaker according to FIG. 5.

FIG. 6 illustrates an implementation of the solid-state circuit breaker according to FIG. 5.

Figure 7:
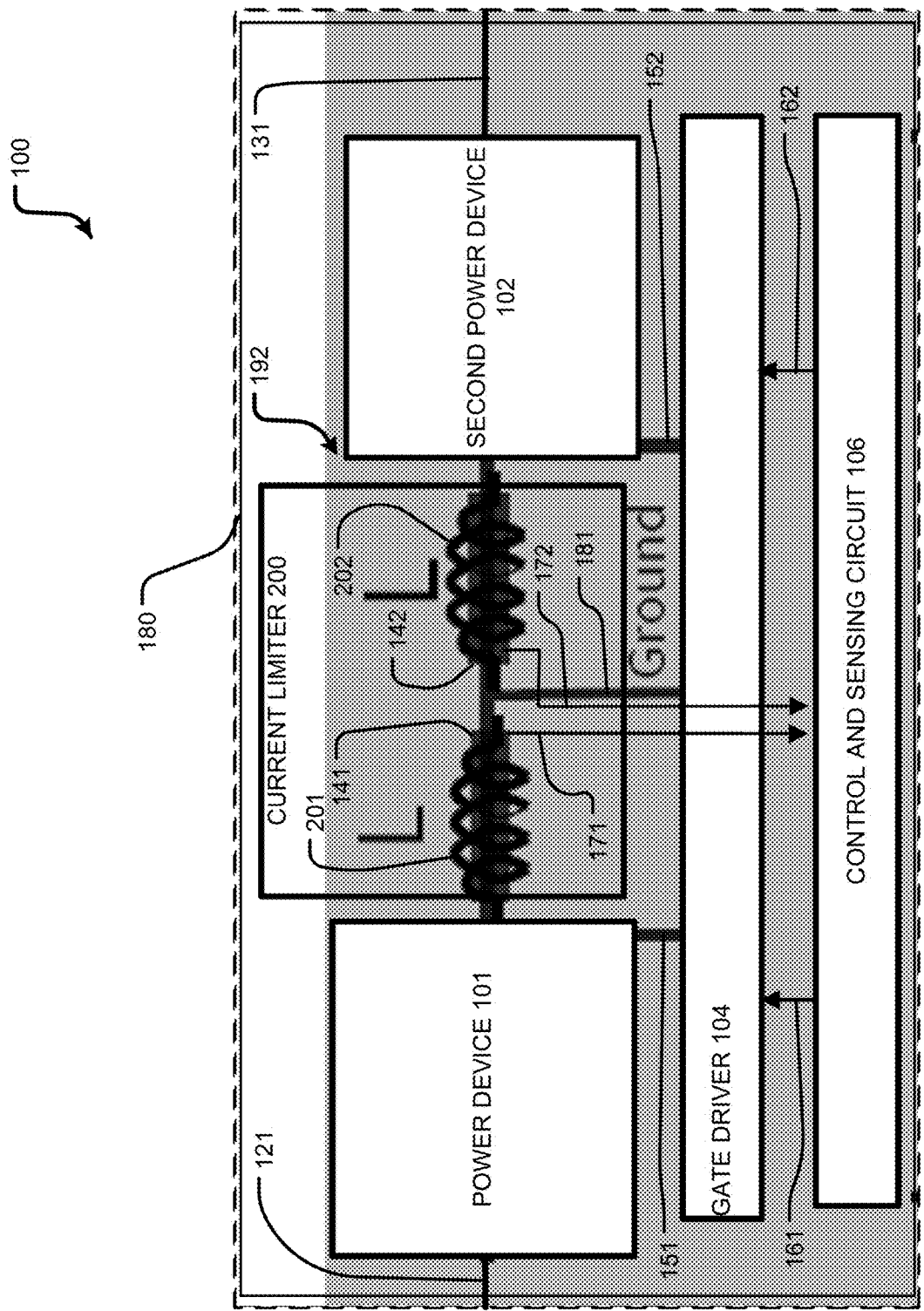
FIG. 7 illustrates another implementation of the solid-state circuit breaker according to FIG. 5.

FIG. 7 illustrates another implementation of the solid-state circuit breaker according to FIG. 5.

Figure 8:
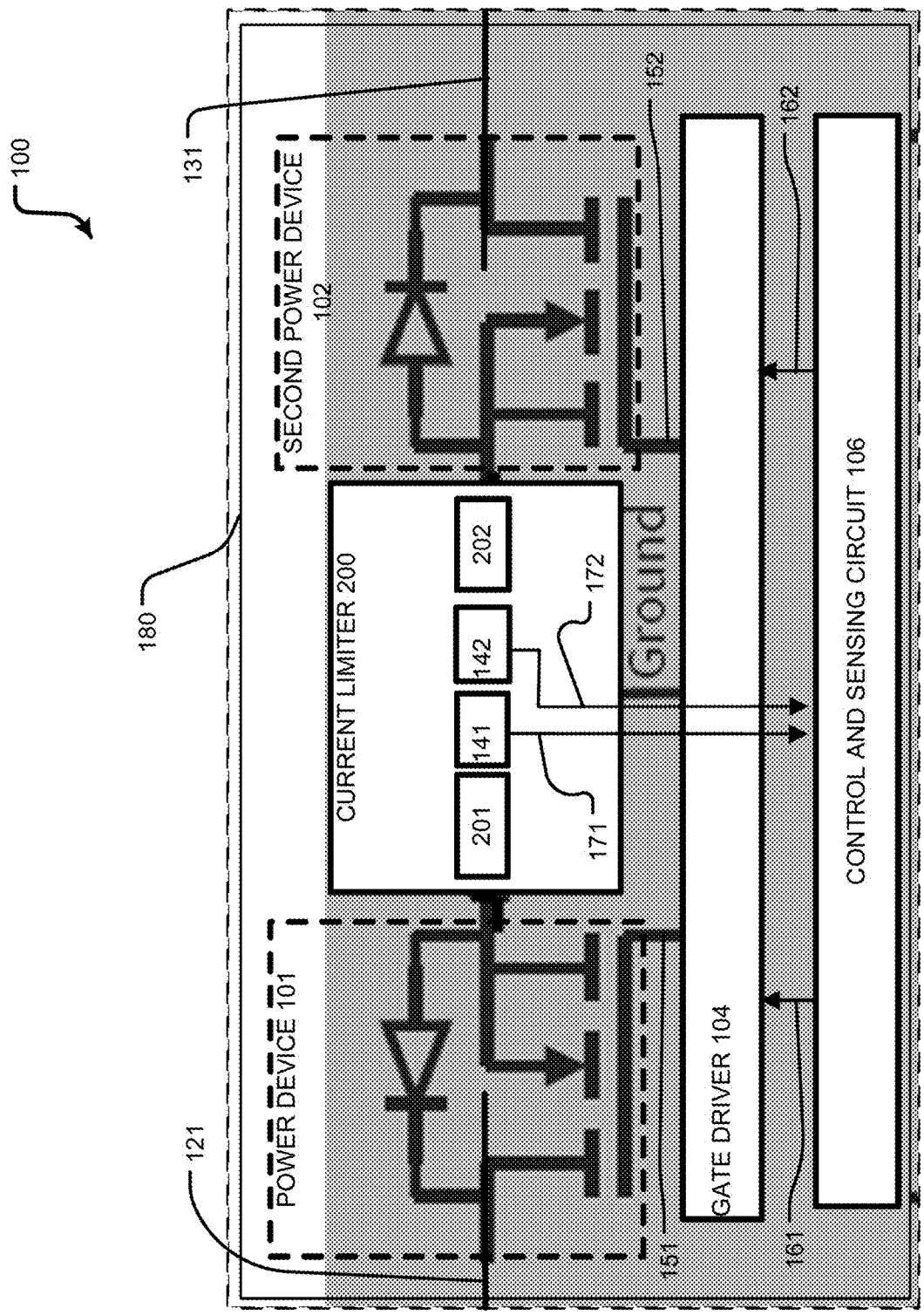
FIG. 8 illustrates another implementation of the solid-state circuit breaker according to FIG. 5.

FIG. 8 illustrates another implementation of the solid-state circuit breaker according to FIG. 5.

The aspects of the solid state circuit breaker 100, the current limiter 200, and/or the system 300 illustrated in FIG. 5, FIG. 6, FIG. 7, and FIG. 8 and described therewith may optionally include any of the other aspects of the solid state circuit breaker 100, the current limiter 200, and/or the system 300 described herein. Further, the solid state circuit breaker 100 illustrated in FIG. 5 may implement the at least one power device 101, the current sensor 141, the parasitic inductance component 201, and/or the like as previously described.

In particular, FIG. 5 illustrates the system 300 implementing the solid state circuit breaker 100. In aspects, the solid state circuit breaker 100 may be configured as a bi-directional implementation of the solid state circuit breaker 100.

With reference to FIG. 5, the solid state circuit breaker 100 may further include at least one second power device 102, a second current sensor 142, and/or the like. Further, the solid state circuit breaker 100 may implement the current limiter 200 with a second parasitic inductance 202, and/or the like. Additionally, the system 300 may include a power source 308. The power source 308 may be an AC power source. However, the system 300 of FIG. 5 may alternatively implement a DC power source.

With reference to FIG. 5, the solid state circuit breaker 100 may implement the second parasitic inductance 202 and the second current sensor 142 as separate components. As illustrated in FIG. 5, the second parasitic inductance 202 is connected to the at least one second power device 102 and the second current sensor 142. More specifically, the second parasitic inductance 202 may be arranged between the at least one second power device 102 and the second current sensor 142. Further, the second current sensor 142 may connect to the current sensor 141 and/or the parasitic inductance component 201.

In other aspects, the second current sensor 142 may be arranged between the at least one second power device 102 and the second parasitic inductance 202. Further, the second parasitic inductance 202 may connect to the current sensor 141 and/or the parasitic inductance component 201 (not shown). In other aspects, the second current sensor 142 and the second parasitic inductance 202 may be integrated as illustrated in FIG. 7. Accordingly, the second parasitic inductance 202 and the second current sensor 142 may connect to the at least one second power device 102; and the second parasitic inductance 202 and the second current sensor 142 may connect to the current sensor 141 and/or the parasitic inductance component 201.

In aspects, the second current sensor 142 may provide an overcurrent signal 172. In aspects, the second current sensor 142 may detect a current anywhere between the AC power source 308 and the load 304.

Thereafter, the control and sensing circuit 106 may generate and send a control signal 162 to the gate driver 104 in response to the overcurrent signal 172. Thereafter, the gate driver 104 may provide a gate drive signal 152 in response to the control signal 162 from the control and sensing circuit 106. Thereafter, in response to the gate drive signal 152, the at least one second power device 102 may turn off. Turning off the at least one second power device 102 may disconnect the AC power source 308 from the load 304. Moreover, turning off the at least one second power device 102 may discontinue delivering power between the AC power source 308 and the load 304.

As there is a finite amount of time between the second current sensor 142 sending the overcurrent signal 172, the control and sensing circuit 106 sending the control signal 162, the gate driver 104 sending the gate drive signal 152, and the at least one second power device 102 turning off in response to the gate drive signal 152, the solid state circuit breaker 100 may implement the current limiter 200 and/or the second parasitic inductance 202. In aspects, the current limiter 200 and/or the second parasitic inductance 202 may limit a current within and/or limit a rate of current change (di/dt) within the solid state circuit breaker 100 and prevent damage to components of the solid state circuit breaker 100 including the at least one second power device 102 during this finite amount of time.

In particular, the second current sensor 142 may sense an overcurrent between the AC power source 308 and the load 304. The second current sensor 142 may provide the overcurrent signal 172 to the control and sensing circuit 106 in response to sensing an overcurrent between the AC power source 308 and the load 304.

Thereafter, the control and sensing circuit 106 may generate and send a control signal 162 to the gate driver 104 in response to the overcurrent signal 172. Thereafter, the gate driver 104 may provide a gate drive signal 152 in response to the control signal 162 from the control and sensing circuit 106. Thereafter, in response to the gate drive signal 152, the at least one second power device 102 may turn off. Turning off the at least one second power device 102 may disconnect the AC power source 308 from the load 304. Moreover, turning off the at least one second power device 102 may discontinue delivering power between the AC power source 308 and the load 304.

As there is a finite amount of time between the second current sensor 142 sending the overcurrent signal 172, the control and sensing circuit 106 sending the control signal 162, the gate driver 104 sending the gate drive signal 152, and the at least one second power device 102 turning off in response to the gate drive signal 152, the solid state circuit breaker 100 may implement the current limiter 200 and/or the second parasitic inductance 202. In aspects, the current limiter 200 and/or the second parasitic inductance 202 may limit a current within and/or limit a rate of current change (di/dt) within the solid state circuit breaker 100 and prevent damage to components of the solid state circuit breaker 100 including the at least one second power device 102 during this finite amount of time.

In aspects, the current limiter 200, the parasitic inductance component 201, and/or the second parasitic inductance 202 may be arranged between the at least one power device 101 and the at least one second power device 102. Further, the at least one second power device 102 may connect to the first power load output 131. In aspects, the first power load output 131 may be electrically connected to the at least one second power device 102. In aspects, the first power load output 131 may be electrically connected to the at least one second power device 102 to receive power from the at least one power device 101 and/or the current limiter 200.

In further aspects, a device may include the at least one power device 101, the at least one second power device 102, the gate driver 104, the control and sensing circuit 106, the current limiter 200, the current sensor 141, the support 180, and/or the like as disclosed herein. In particular aspects, the various disclosed configurations of the at least one power device 101, the at least one second power device 102, and the current limiter 200 may be implemented in non-circuit breaker configurations. For example, normally-on applications implementing a power device may implement configurations of the at least one power device 101, the at least one second power device 102, and the current limiter 200 of the disclosure. Likewise, the various disclosed configurations of the at least one power device 101, the at least one second power device 102, the current limiter 200, and/or the gate driver 104 may be implemented in non-circuit breaker configurations. For example, normally-on applications implementing a power device may implement configurations of the at least one power device 101, the at least one second power device 102, the current limiter 200, and/or the gate driver 104 of the disclosure.

FIG. 7 illustrates an exemplary implementation of the second current sensor 142 and the second parasitic inductance 202. As illustrated in FIG. 7, the second current sensor 142 and the second parasitic inductance 202 may be integrated.

Additionally, FIG. 7 illustrates that the current limiter 200 may connect along the line 181 to the gate driver 104. Accordingly, the gate driver 104, the gate drive signal 152, the at least one second power device 102, the second parasitic inductance 202, the second current sensor 142, the line 181, and/or the like may in part form a gate drive loop 192. In this regard, the second parasitic inductance 202 may increase a parasitic inductance in the gate drive loop 192 to limit a rate of current change (di/dt) during a fault.

FIG. 8 illustrates an exemplary implementation of the at least one power device 101 and the at least one second power device 102. In this regard, FIG. 8 illustrates the at least one power device 101 and the at least one second power device 102 may be each implemented as a MOSFET having a diode arranged in parallel. In aspects, the at least one power device 101 may be a MOSFET, an IGBT, a silicon MOSFET, a silicon IGBT, a silicon carbide MOSFET, a silicon carbide IGBT, and/or the like.

Figure 9:
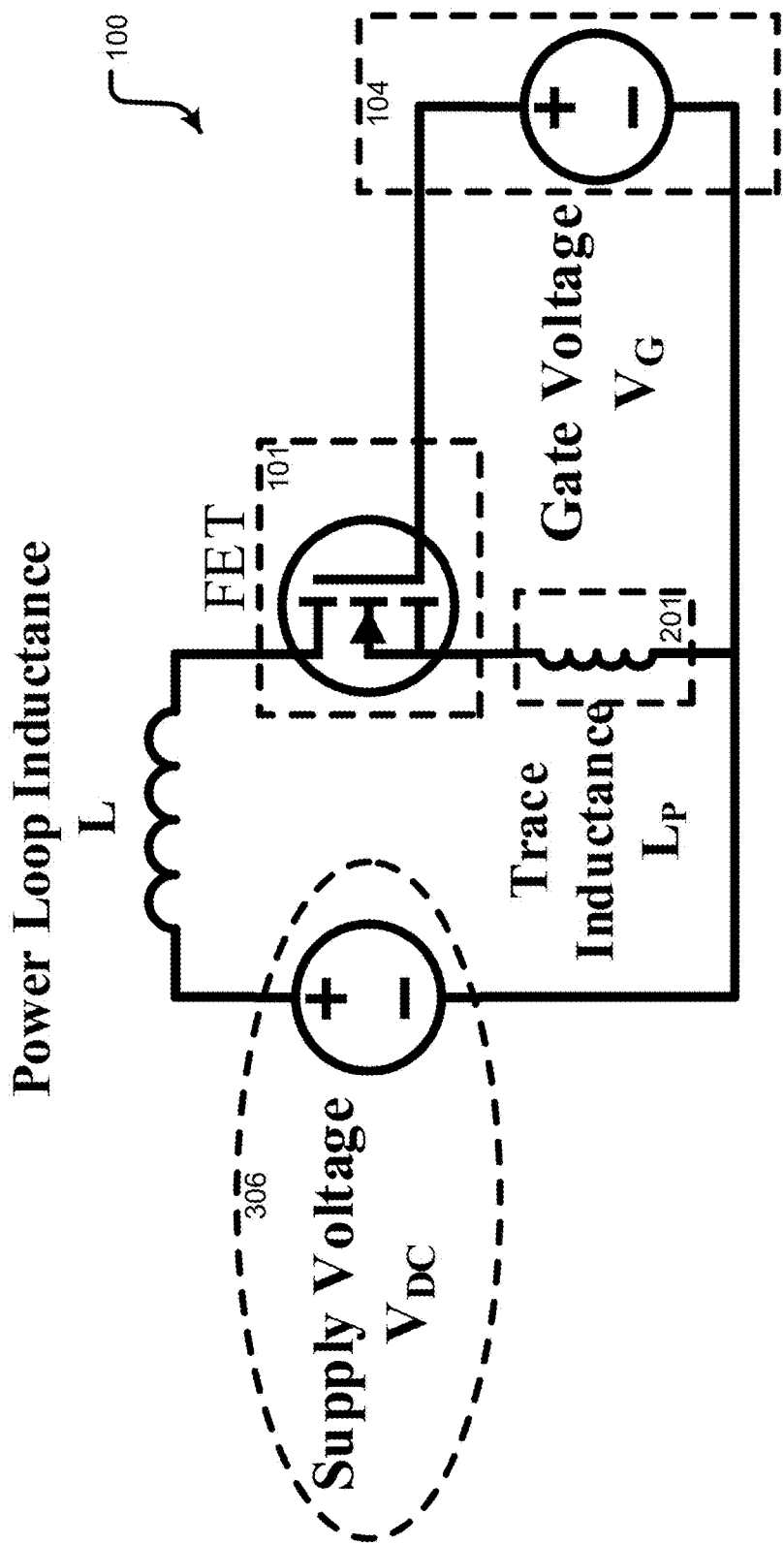
FIG. 9 illustrates an exemplary implementation of the solid state circuit breaker that includes the parasitic inductance component according to aspects of the disclosure for simulation.

FIG. 9 illustrates an exemplary implementation of the solid state circuit breaker that includes the parasitic inductance component according to aspects of the disclosure for simulation.

Figure 10:
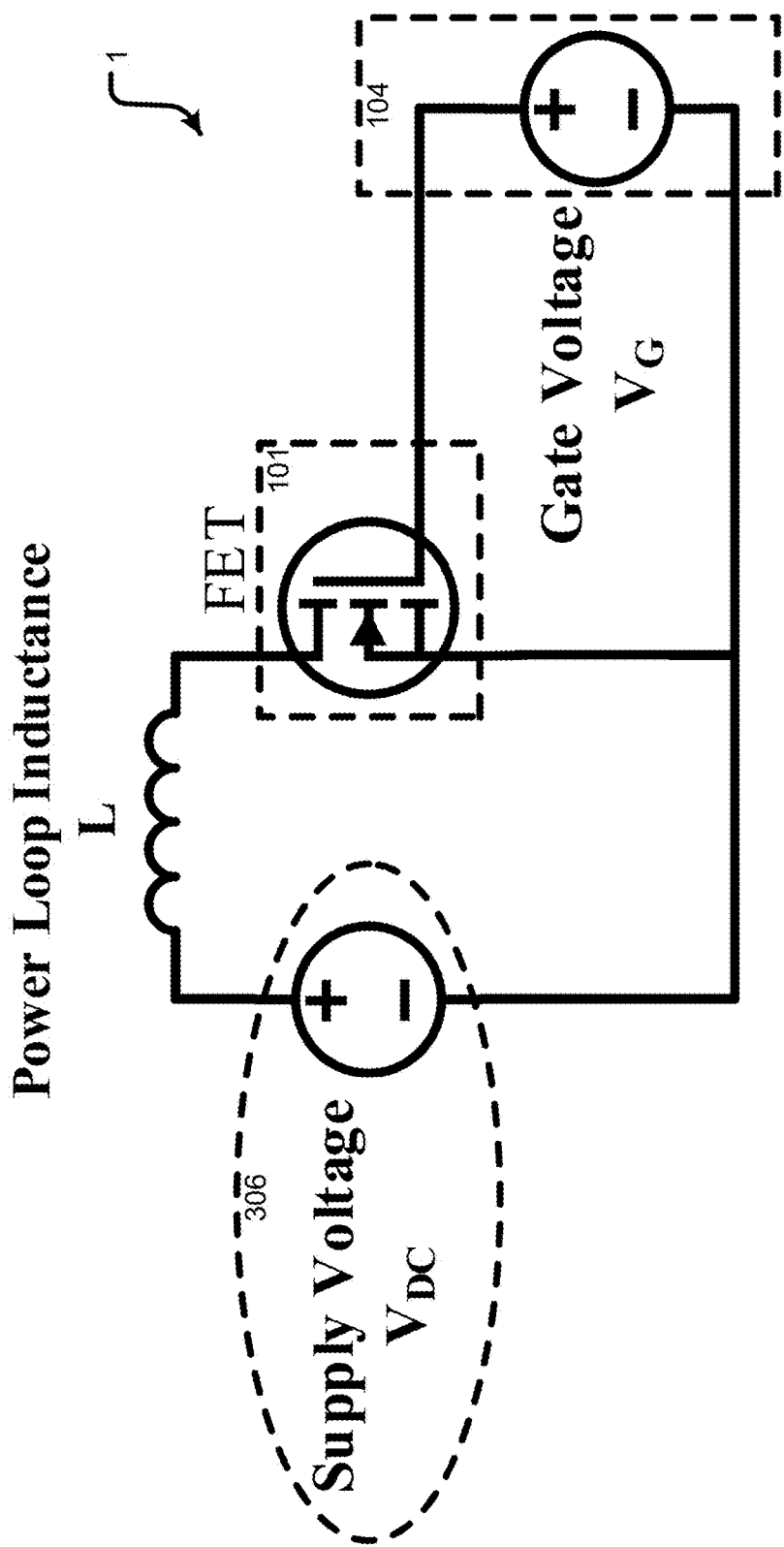
FIG. 10 illustrates an exemplary implementation of a solid state circuit breaker that does not include the parasitic inductance component for simulation.

FIG. 10 illustrates an exemplary implementation of a solid state circuit breaker that does not include the parasitic inductance component for simulation.

Figure 11:
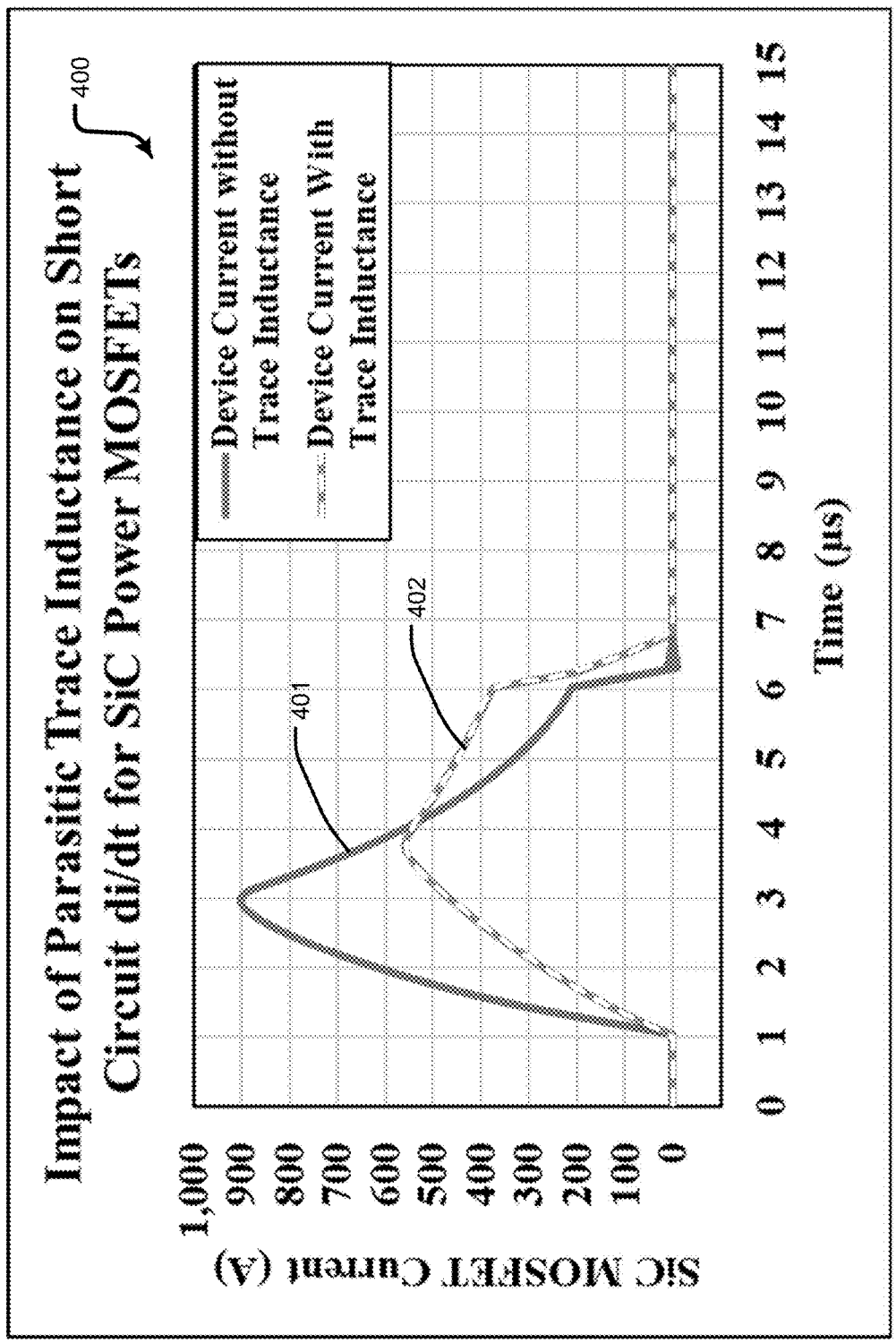
FIG. 11 illustrates a graph of simulation results comparing operation of the solid state circuit breaker that includes the parasitic inductance component illustrated in FIG. 9 and the solid state circuit breaker that does not include the parasitic inductance component illustrated in FIG. 10 during a fault.

FIG. 11 illustrates a graph of simulation results comparing operation of the solid state circuit breaker that includes the parasitic inductance component illustrated in FIG. 9 and the solid state circuit breaker that does not include the parasitic inductance component illustrated in FIG. 10 during a fault.

In particular, FIG. 9 illustrates an exemplary implementation of the solid state circuit breaker 100 that implements the at least one power device 101 as a SiC MOSFET (Wolfspeed Gen 3 C3M0016120D, available from Wolfspeed, Inc., Durham, North Carolina, USA). Further, the gate driver 104 is configured to generate a gate voltage of −5 volts/+15 volts. The parasitic inductance component 201 is configured with a trace parasitic Inductance Lp of 20 nH. Further, the power source 306 is configured as a DC voltage supply with a supply voltage of 800 V. Finally, the solid state circuit breaker 100 may have a power loop inductance L of 1 pH.

FIG. 10 illustrates an exemplary implementation of a non-trace inductance component solid state circuit breaker 1 that does not include the parasitic inductance component 201 for simulation. In particular, FIG. 10 illustrates an exemplary implementation of the non-trace inductance component solid state circuit breaker 1 that implements the at least one power device 101 as a SiC MOSFET (Wolfspeed Gen 3 C3M0016120D, available from Wolfspeed, Inc., Durham, North Carolina, USA). Further, the gate driver 104 is configured to generate a gate voltage of: −5 volts/+15 volts. Further, the power source 306 is configured as a DC voltage supply with a supply voltage of 800 V. Additionally, the non-trace inductance component solid state circuit breaker 1 may have a power loop inductance L of 1 pH. Finally, the implementation of the non-trace inductance component solid state circuit breaker 1 and FIG. 10 does not include implementation of the parasitic inductance component 201.

FIG. 11 illustrates a graph of simulation results comparing operation of the solid state circuit breaker 100 illustrated in FIG. 9 and the non-trace inductance component solid state circuit breaker 1 illustrated in FIG. 10 during a fault. In particular, FIG. 11 illustrates a graph 400 of an impact of parasitic trace inductance on short-circuit di/dt (rate of current change) for the SiC power MOSFETs of the solid state circuit breaker 100 and the non-trace inductance component solid state circuit breaker 1.

The graph 400 includes a vertical axis providing a current 401 of the SiC power MOSFETs of the non-trace inductance component solid state circuit breaker 1 illustrated in FIG. 10 and a current 402 of the SiC power MOSFETs of the solid state circuit breaker 100 illustrated in FIG. 9 with respect to time in microseconds ((μs) horizontal axis). Further, the fault is initiated in the simulation at time 1 μs.

As can be readily appreciated by the graph 400 illustrated in FIG. 11, the rate of current change (di/dt) during a fault is significantly reduced with the parasitic inductance component 201 implemented by the solid state circuit breaker 100. In particular, the 20 nH trace inductance implemented by the parasitic inductance component 201 of the solid state circuit breaker 100 suppresses current by 49% at time t=3 μs (2 μs after fault event).

It should be further appreciated that the parasitic inductance of the parasitic inductance component 201 of the solid state circuit breaker 100 may be adjusted, for example by modifying a layout design of the support 180, such as a PCB layout design. Moreover, a presence of the parasitic inductance of the parasitic inductance component 201 dampens a peak current seen during an inductor ramp-up.

Accordingly, the disclosure has set forth a solid-state circuit breaker configured to limit a current and/or a rate of current change during a fault event and potential limit damage to the solid-state circuit breaker. Further, the disclosure has set forth a process of implementing a solid-state circuit breaker configured to limit a current and/or a rate of current change during a fault event and potential limit damage to the solid-state circuit breaker.

The following are a number of nonlimiting EXAMPLES of aspects of the disclosure.

One EXAMPLE: a device includes at least one power device. The device in addition includes a gate driver. The device moreover includes a control and sensing circuit. The device also includes a current sensor. The device further includes a current limiter that comprises a parasitic inductance component. The device in addition includes where the parasitic inductance component is configured, structured, and/or implemented to limit a rate of current change (di/dt) during a fault. The device moreover includes where the device is configured to be implemented in a system that comprises a load and a power source.

The above-noted EXAMPLE may further include any one or a combination of more than one of the following EXAMPLES: The device of the above-noted EXAMPLE where the current limiter and/or the parasitic inductance component are configured, structured, and/or implemented to increase parasitic inductance in a gate drive of the at least one power device. The device of the above-noted EXAMPLE where the current limiter and/or the parasitic inductance component are configured, structured, and/or implemented to increase parasitic inductance in a gate drive of the at least one power device to limit a rate of current change (di/dt) during a fault. The device of the above-noted EXAMPLE where the current limiter and/or the parasitic inductance component are configured such that a voltage drop across the parasitic inductance component counters a gate voltage increase of the at least one power device. The device of the above-noted EXAMPLE where the current limiter and/or the parasitic inductance component are configured to reduce a likelihood of damage to circuits, devices, components, and/or equipment of the device. The device of the above-noted EXAMPLE where the device is configured as an uni-directional device. The device of the above-noted EXAMPLE where the parasitic inductance component is implemented as a printed circuit board (PCB) trace. The device of the above-noted EXAMPLE where the parasitic inductance component is implemented as a copper plate. The device of the above-noted EXAMPLE where the parasitic inductance component has an inductance of less than 100 nH. The device of the above-noted EXAMPLE where the parasitic inductance component has an inductance of 5 nH to 100 nH. The device of the above-noted EXAMPLE where the parasitic inductance component is configured as a metallic trace, a metallic plate, a metallic coil, and/or a spiral metallic configuration. The device of the above-noted EXAMPLE where the parasitic inductance component is structured and arranged on a circuit substrate, in or with the current sensor, and/or in or on a printed circuit board. The device of the above-noted EXAMPLE where the parasitic inductance component is part of the current sensor implemented as a current shunt. The device of the above-noted EXAMPLE where the parasitic inductance component is configured to limit current and/or limit a rate of current change (di/dt) within the device and protect the device from damage. The device of the above-noted EXAMPLE where the current limiter and/or the parasitic inductance component are configured to limit a current within and/or limit a rate of current change (di/dt) within the device and prevent damage to components of the device including the at least one power device. The device of the above-noted EXAMPLE where the parasitic inductance component and the current sensor are configured as separate components. The device of the above-noted EXAMPLE where the current sensor and the parasitic inductance component are integrated. The device of the above-noted EXAMPLE where the current sensor comprises the parasitic inductance component. The device of the above-noted EXAMPLE where the parasitic inductance component is the current sensor implemented as a current shunt. The device of the above-noted EXAMPLE where the power source comprises a DC power source or an AC power source. The device of the above-noted EXAMPLE where the current sensor is implemented as a shunt resistor, a current transformer, a Rogowski coil, a magnetic field sensor, a fluxgate sensor, and/or a magneto-resistive current sensor. The device of the above-noted EXAMPLE where the current sensor is implemented as a shunt resistor. The device of the above-noted EXAMPLE where the current sensor is configured to detect an overcurrent; where the current sensor is configured to generate an overcurrent signal in response to an overcurrent; where the control and sensing circuit is configured to generate and send a control signal to the gate driver in response to the overcurrent signal; where the gate driver is configured to generate a gate driver signal in response to the control signal; where the at least one power device is configured to turn off in response to the gate driver signal; and where turning off the at least one power device disconnects the power source from the load. The device of the above-noted EXAMPLE includes a first power source input and a first power load output, where the first power source input is electrically connected to the at least one power device to provide power to the at least one power device from the power source; and where the first power load output is electrically connected to the current limiter. The device of the above-noted EXAMPLE where the at least one power device is a MOSFET (Metal-Oxide-Semiconductor Field-Effect Transistor), an IGBT (Insulated-Gate Bipolar Transistor), a silicon MOSFET, a silicon IGBT, a silicon carbide MOSFET, and/or a silicon carbide IGBT. The device of the above-noted EXAMPLE where the at least one power device implemented as a MOSFET having a diode arranged in parallel. The device of the above-noted EXAMPLE includes: at least one second power device; a second current sensor; and a second parasitic inductance component, where the second parasitic inductance component is configured, structured, and/or implemented to limit a rate of current change (di/dt) during a fault. The device of the above-noted EXAMPLE where the current limiter and/or the second parasitic inductance component are configured, structured, and/or implemented to increase parasitic inductance in a gate drive of the at least one second power device. The device of the above-noted EXAMPLE where the current limiter and/or the second parasitic inductance component are configured, structured, and/or implemented to increase parasitic inductance in a gate drive of the at least one second power device to limit a rate of current change (di/dt) during a fault. The device of the above-noted EXAMPLE where the current limiter and/or the second parasitic inductance component are configured such that a voltage drop across the second parasitic inductance component counters a gate voltage increase of the at least one second power device. The device of the above-noted EXAMPLE where the current limiter and/or the second parasitic inductance component are configured to reduce a likelihood of damage to circuits, devices, components, and/or equipment of the device. The device of the above-noted EXAMPLE where the device is configured as a bi-directional device. The device of the above-noted EXAMPLE where the second parasitic inductance component is implemented as a printed circuit board (PCB) trace. The device of the above-noted EXAMPLE where the second parasitic inductance component is implemented as a copper plate. The device of the above-noted EXAMPLE where the second parasitic inductance component has an inductance of less than 100 nH. The device of the above-noted EXAMPLE where the second parasitic inductance component has an inductance of 5 nH to 100 nH. The device of the above-noted EXAMPLE where the second parasitic inductance component is configured as a metallic trace, a metallic plate, a metallic coil, and/or a spiral metallic configuration. The device of the above-noted EXAMPLE where the second parasitic inductance component is structured and arranged on a circuit substrate, in or with the second current sensor, and/or in or on a printed circuit board. The device of the above-noted EXAMPLE where the second parasitic inductance component is part of the second current sensor implemented as a current shunt. The device of the above-noted EXAMPLE where the second parasitic inductance component is configured to limit current and/or limit a rate of current change (di/dt) within the device and protect the device from damage. The device of the above-noted EXAMPLE where the current limiter and/or the second parasitic inductance component is configured to limit a current within and/or limit a rate of current change (di/dt) within the device and prevent damage to components of the device including the at least one second power device. The device of the above-noted EXAMPLE where the second parasitic inductance component and the second current sensor are configured as separate components. The device of the above-noted EXAMPLE where the second current sensor and the second parasitic inductance component are integrated. The device of the above-noted EXAMPLE where the second current sensor comprises the second parasitic inductance component. The device of the above-noted EXAMPLE where the second parasitic inductance component is the second current sensor implemented as a current shunt. The device of the above-noted EXAMPLE where the power source comprises a DC power source or an AC power source. The device of the above-noted EXAMPLE where the second current sensor is implemented as a shunt resistor, a current transformer, a Rogowski coil, a magnetic field sensor, a fluxgate sensor, and/or a magneto-resistive second current sensor. The device of the above-noted EXAMPLE where the second current sensor is implemented as a shunt resistor.

One EXAMPLE: a process of implementing a device includes providing at least one power device. The process in addition includes providing a gate driver. The process moreover includes providing a control and sensing circuit. The process also includes providing a current sensor. The process further includes providing a current limiter that comprises a parasitic inductance component. The process in addition includes configuring the parasitic inductance component to limit a rate of current change (di/dt) during a fault. The process moreover includes where the device is configured to be implemented in a system that comprises a load and a power source.

The above-noted EXAMPLE may further include any one or a combination of more than one of the following EXAMPLES: The process of the above-noted EXAMPLE where the current limiter and/or the parasitic inductance component are configured, structured, and/or implemented to increase parasitic inductance in a gate drive of the at least one power device. The process of the above-noted EXAMPLE where the current limiter and/or the parasitic inductance component are configured, structured, and/or implemented to increase parasitic inductance in a gate drive of the at least one power device to limit a rate of current change (di/dt) during a fault. The process of the above-noted EXAMPLE where the current limiter and/or the parasitic inductance component are configured such that a voltage drop across the parasitic inductance component counters a gate voltage increase of the at least one power device. The process of the above-noted EXAMPLE where the current limiter and/or the parasitic inductance component are configured to reduce a likelihood of damage to circuits, devices, components, and/or equipment of the device. The process of the above-noted EXAMPLE where the device is configured as a uni-directional device. The process of the above-noted EXAMPLE where the parasitic inductance component is implemented as a printed circuit board (PCB) trace. The process of the above-noted EXAMPLE where the parasitic inductance component is implemented as a copper plate. The process of the above-noted EXAMPLE where the parasitic inductance component has an inductance of less than 100 nH. The process of the above-noted EXAMPLE where the parasitic inductance component has an inductance of 5 nH to 100 nH. The process of the above-noted EXAMPLE where the parasitic inductance component is configured as a metallic trace, a metallic plate, a metallic coil, and/or a spiral metallic configuration. The process of the above-noted EXAMPLE where the parasitic inductance component is structured and arranged on a circuit substrate, in or with the current sensor, and/or in or on a printed circuit board. The process of the above-noted EXAMPLE where the parasitic inductance component is part of the current sensor implemented as a current shunt. The process of the above-noted EXAMPLE where the parasitic inductance component is configured to limit current and/or limit a rate of current change (di/dt) within the device and protect the device from damage. The process of the above-noted EXAMPLE where the current limiter and/or the parasitic inductance component are configured to limit a current within and/or limit a rate of current change (di/dt) within the device and prevent damage to components of the device including the at least one power device. The process of the above-noted EXAMPLE where the parasitic inductance component and the current sensor are configured as separate components. The process of the above-noted EXAMPLE where the current sensor and the parasitic inductance component are integrated. The process of the above-noted EXAMPLE where the current sensor comprises the parasitic inductance component. The process of the above-noted EXAMPLE where the parasitic inductance component is the current sensor implemented as a current shunt. The process of the above-noted EXAMPLE where the power source comprises a DC power source or an AC power source. The process of the above-noted EXAMPLE where the current sensor is implemented as a shunt resistor, a current transformer, a Rogowski coil, a magnetic field sensor, a fluxgate sensor, and/or a magneto-resistive current sensor. The process of the above-noted EXAMPLE where the current sensor is implemented as a shunt resistor. The process of the above-noted EXAMPLE where the current sensor is configured to detect an overcurrent; where the current sensor is configured to generate an overcurrent signal in response to an overcurrent; where the control and sensing circuit is configured to generate and send a control signal to the gate driver in response to the overcurrent signal; where the gate driver is configured to generate a gate driver signal in response to the control signal; where the at least one power device is configured to turn off in response to the gate driver signal; and where turning off the at least one power device disconnects the power source from the load. The process of the above-noted EXAMPLE includes providing a first power source input and a first power load output, where the first power source input is electrically connected to the at least one power device to provide power to the at least one power device from the power source; and where the first power load output is electrically connected to the current limiter. The process of the above-noted EXAMPLE where the at least one power device is a MOSFET (Metal-Oxide-Semiconductor Field-Effect Transistor), an IGBT (Insulated-Gate Bipolar Transistor), a silicon MOSFET, a silicon IGBT, a silicon carbide MOSFET, and/or a silicon carbide IGBT. The process of the above-noted EXAMPLE where the at least one power device implemented as a MOSFET having a diode arranged in parallel. The process of the above-noted EXAMPLE includes: providing at least one second power device; providing a second current sensor; providing a second parasitic inductance component; and configuring the second parasitic inductance component to limit a rate of current change (di/dt) during a fault. The process of the above-noted EXAMPLE where the current limiter and/or the second parasitic inductance component are configured, structured, and/or implemented to increase parasitic inductance in a gate drive of the at least one second power device. The process of the above-noted EXAMPLE where the current limiter and/or the second parasitic inductance component are configured, structured, and/or implemented to increase parasitic component in a gate drive of the at least one second power device to limit a rate of current change (di/dt) during a fault. The process of the above-noted EXAMPLE where the current limiter and/or the second parasitic inductance component are configured such that a voltage drop across the second parasitic inductance component counters a gate voltage increase of the at least one second power device. The process of the above-noted EXAMPLE where the current limiter and/or the second parasitic inductance component are configured to reduce a likelihood of damage to circuits, devices, components, and/or equipment of the device. The process of the above-noted EXAMPLE where the device is configured as a bi-directional device. The process of the above-noted EXAMPLE where the second parasitic inductance component is implemented as a printed circuit board (PCB) trace. The process of the above-noted EXAMPLE where the second parasitic inductance component is implemented as a copper plate. The process of the above-noted EXAMPLE where the second parasitic inductance component has an inductance of less than 100 nH. The process of the above-noted EXAMPLE where the second parasitic inductance component has an inductance of 5 nH to 100 nH. The process of the above-noted EXAMPLE where the second parasitic inductance component is configured as a metallic trace, a metallic plate, a metallic coil, and/or a spiral metallic configuration. The process of the above-noted EXAMPLE where the second parasitic inductance component is structured and arranged on a circuit substrate, in or with the second current sensor, and/or in or on a printed circuit board. The process of the above-noted EXAMPLE where the second parasitic inductance component is part of the second current sensor implemented as a current shunt. The process of the above-noted EXAMPLE where the second parasitic inductance component is configured to limit current and/or limit a rate of current change (di/dt) within the device and protect the device from damage. The process of the above-noted EXAMPLE where the current limiter and/or the second parasitic inductance component is configured to limit a current within and/or limit a rate of current change (di/dt) within the device and prevent damage to components of the device including the at least one second power device. The process of the above-noted EXAMPLE where the second parasitic inductance component and the second current sensor are configured as separate components. The process of the above-noted EXAMPLE where the second current sensor and the second parasitic inductance component are integrated. The process of the above-noted EXAMPLE where the second current sensor comprises the second parasitic inductance component. The process of the above-noted EXAMPLE where the second parasitic inductance component is the second current sensor implemented as a current shunt. The process of the above-noted EXAMPLE where the power source comprises a DC power source or an AC power source. The process of the above-noted EXAMPLE where the second current sensor is implemented as a shunt resistor, a current transformer, a Rogowski coil, a magnetic field sensor, a fluxgate sensor, and/or a magneto-resistive second current sensor. The process of the above-noted EXAMPLE where the second current sensor is implemented as a shunt resistor.

One EXAMPLE: a device includes at least one power device. The device in addition includes a gate driver. The breaker moreover includes a control and sensing circuit. The breaker also includes a current sensor. The breaker further includes a current limiter that comprises a parasitic inductance component configured, to increase parasitic inductance in a gate drive of the at least one power device. The breaker in addition includes where the device is configured to be implemented in a system that comprises a load and a power source.

The above-noted EXAMPLE may further include any one or a combination of more than one of the following EXAMPLES: The device of the above-noted EXAMPLE where the parasitic inductance component is configured, structured, and/or implemented to limit a rate of current change (di/dt) during a fault. The device of the above-noted EXAMPLE where the current limiter and/or the parasitic inductance component are configured, structured, and/or implemented to increase parasitic inductance in a gate drive of the at least one power device to limit a rate of current change (di/dt) during a fault. The device of the above-noted EXAMPLE where the current limiter and/or the parasitic inductance component are configured such that a voltage drop across the parasitic inductance component counters a gate voltage increase of the at least one power device. The device of the above-noted EXAMPLE where the current limiter and/or the parasitic inductance component are configured to reduce a likelihood of damage to circuits, devices, components, and/or equipment of the device. The device of the above-noted EXAMPLE where the device is configured as an uni-directional device. The device of the above-noted EXAMPLE where the parasitic inductance component is implemented as a printed circuit board (PCB) trace. The device of the above-noted EXAMPLE where the parasitic inductance component is implemented as a copper plate. The device of the above-noted EXAMPLE where the parasitic inductance component has an inductance of less than 100 nH. The device of the above-noted EXAMPLE where the parasitic inductance component has an inductance of 5 nH to 100 nH. The device of the above-noted EXAMPLE where the parasitic inductance component is configured as a metallic trace, a metallic plate, a metallic coil, and/or a spiral metallic configuration. The device of the above-noted EXAMPLE where the parasitic inductance component is structured and arranged on a circuit substrate, in or with the current sensor, and/or in or on a printed circuit board. The device of the above-noted EXAMPLE where the parasitic inductance component is part of the current sensor implemented as a current shunt. The device of the above-noted EXAMPLE where the parasitic inductance component is configured to limit current and/or limit a rate of current change (di/dt) within the device and protect the device from damage. The device of the above-noted EXAMPLE where the current limiter and/or the parasitic inductance component are configured to limit a current within and/or limit a rate of current change (di/dt) within the device and prevent damage to components of the device including the at least one power device. The device of the above-noted EXAMPLE where the parasitic inductance component and the current sensor are configured as separate components. The device of the above-noted EXAMPLE where the current sensor and the parasitic inductance component are integrated. The device of the above-noted EXAMPLE where the current sensor comprises the parasitic inductance component. The device of the above-noted EXAMPLE where the parasitic inductance component is the current sensor implemented as a current shunt. The device of the above-noted EXAMPLE where the power source comprises a DC power source or an AC power source. The device of the above-noted EXAMPLE where the current sensor is implemented as a shunt resistor, a current transformer, a Rogowski coil, a magnetic field sensor, a fluxgate sensor, and/or a magneto-resistive current sensor. The device of the above-noted EXAMPLE where the current sensor is implemented as a shunt resistor. The device of the above-noted EXAMPLE where the current sensor is configured to detect an overcurrent; where the current sensor is configured to generate an overcurrent signal in response to an overcurrent; where the control and sensing circuit is configured to generate and send a control signal to the gate driver in response to the overcurrent signal; where the gate driver is configured to generate a gate driver signal in response to the control signal; where the at least one power device is configured to turn off in response to the gate driver signal; and where turning off the at least one power device disconnects the power source from the load. The device of the above-noted EXAMPLE includes a first power source input and a first power load output, where the first power source input is electrically connected to the at least one power device to provide power to the at least one power device from the power source; and where the first power load output is electrically connected to the current limiter. The device of the above-noted EXAMPLE where the at least one power device is a MOSFET (Metal-Oxide-Semiconductor Field-Effect Transistor), an IGBT (Insulated-Gate Bipolar Transistor), a silicon MOSFET, a silicon IGBT, a silicon carbide MOSFET, and/or a silicon carbide IGBT. The device of the above-noted EXAMPLE where the at least one power device implemented as a MOSFET having a diode arranged in parallel. The device of the above-noted EXAMPLE includes: at least one second power device; a second current sensor; and a second parasitic inductance component, where the second parasitic inductance component is configured, structured, and/or implemented to limit a rate of current change (di/dt) during a fault. The device of the above-noted EXAMPLE where the current limiter and/or the second parasitic inductance component are configured, structured, and/or implemented to increase parasitic inductance in a gate drive of the at least one second power device. The device of the above-noted EXAMPLE where the current limiter and/or the second parasitic inductance component are configured, structured, and/or implemented to increase parasitic inductance in a gate drive of the at least one second power device to limit a rate of current change (di/dt) during a fault. The device of the above-noted EXAMPLE where the current limiter and/or the second parasitic inductance component are configured such that a voltage drop across the second parasitic inductance component counters a gate voltage increase of the at least one second power device. The device of the above-noted EXAMPLE where the current limiter and/or the second parasitic inductance component are configured to reduce a likelihood of damage to circuits, devices, components, and/or equipment of the device. The device of the above-noted EXAMPLE where the device is configured as a bi-directional device. The device of the above-noted EXAMPLE where the second parasitic inductance component is implemented as a printed circuit board (PCB) trace. The device of the above-noted EXAMPLE where the second parasitic inductance component is implemented as a copper plate. The device of the above-noted EXAMPLE where the second parasitic inductance component has an inductance of less than 100 nH. The device of the above-noted EXAMPLE where the second parasitic inductance component has an inductance of 5 nH to 100 nH. The device of the above-noted EXAMPLE where the second parasitic inductance component is configured as a metallic trace, a metallic plate, a metallic coil, and/or a spiral metallic configuration. The device of the above-noted EXAMPLE where the second parasitic inductance component is structured and arranged on a circuit substrate, in or with the second current sensor, and/or in or on a printed circuit board. The device of the above-noted EXAMPLE where the second parasitic inductance component is part of the second current sensor implemented as a current shunt. The device of the above-noted EXAMPLE where the second parasitic inductance component is configured to limit current and/or limit a rate of current change (di/dt) within the device and protect the device from damage. The device of the above-noted EXAMPLE where the current limiter and/or the second parasitic inductance component is configured to limit a current within and/or limit a rate of current change (di/dt) within the device and prevent damage to components of the device including the at least one second power device. The device of the above-noted EXAMPLE where the second parasitic inductance component and the second current sensor are configured as separate components. The device of the above-noted EXAMPLE where the second current sensor and the second parasitic inductance component are integrated. The device of the above-noted EXAMPLE where the second current sensor comprises the second parasitic inductance component. The device of the above-noted EXAMPLE where the second parasitic inductance component is the second current sensor implemented as a current shunt. The device of the above-noted EXAMPLE where the power source comprises a DC power source or an AC power source. The device of the above-noted EXAMPLE where the second current sensor is implemented as a shunt resistor, a current transformer, a Rogowski coil, a magnetic field sensor, a fluxgate sensor, and/or a magneto-resistive second current sensor. The device of the above-noted EXAMPLE where the second current sensor is implemented as a shunt resistor.

One EXAMPLE: a process includes providing at least one power device. The process in addition includes providing a gate driver. The process moreover includes providing a control and sensing circuit. The process also includes providing a current sensor. The process further includes providing a current limiter that comprises a parasitic inductance component configured, to increase parasitic inductance in a gate drive of the at least one power device. The process in addition includes where the device is configured to be implemented in a system that comprises a load and a power source.

The above-noted EXAMPLE may further include any one or a combination of more than one of the following EXAMPLES: The process of the above-noted EXAMPLE includes configuring the parasitic inductance component to limit a rate of current change (di/dt) during a fault. The process of the above-noted EXAMPLE where the current limiter and/or the parasitic inductance component are configured, structured, and/or implemented to increase parasitic inductance in a gate drive of the at least one power device to limit a rate of current change (di/dt) during a fault. The process of the above-noted EXAMPLE where the current limiter and/or the parasitic inductance component are configured such that a voltage drop across the parasitic inductance component counters a gate voltage increase of the at least one power device. The process of the above-noted EXAMPLE where the current limiter and/or the parasitic inductance component are configured to reduce a likelihood of damage to circuits, devices, components, and/or equipment of the device. The process of the above-noted EXAMPLE where the device is configured as a uni-directional device. The process of the above-noted EXAMPLE where the parasitic inductance component is implemented as a printed circuit board (PCB) trace. The process of the above-noted EXAMPLE where the parasitic inductance component is implemented as a copper plate. The process of the above-noted EXAMPLE where the parasitic inductance component has an inductance of less than 100 nH. The process of the above-noted EXAMPLE where the parasitic inductance component has an inductance of 5 nH to 100 nH. The process of the above-noted EXAMPLE where the parasitic inductance component is configured as a metallic trace, a metallic plate, a metallic coil, and/or a spiral metallic configuration. The process of the above-noted EXAMPLE where the parasitic inductance component is structured and arranged on a circuit substrate, in or with the current sensor, and/or in or on a printed circuit board. The process of the above-noted EXAMPLE where the parasitic inductance component is part of the current sensor implemented as a current shunt. The process of the above-noted EXAMPLE where the parasitic inductance component is configured to limit current and/or limit a rate of current change (di/dt) within the device and protect the device from damage. The process of the above-noted EXAMPLE where the current limiter and/or the parasitic inductance component are configured to limit a current within and/or limit a rate of current change (di/dt) within the device and prevent damage to components of the device including the at least one power device. The process of the above-noted EXAMPLE where the parasitic inductance component and the current sensor are configured as separate components. The process of the above-noted EXAMPLE where the current sensor and the parasitic inductance component are integrated. The process of the above-noted EXAMPLE where the current sensor comprises the parasitic inductance component. The process of the above-noted EXAMPLE where the parasitic inductance component is the current sensor implemented as a current shunt. The process of the above-noted EXAMPLE where the power source comprises a DC power source or an AC power source. The process of the above-noted EXAMPLE where the current sensor is implemented as a shunt resistor, a current transformer, a Rogowski coil, a magnetic field sensor, a fluxgate sensor, and/or a magneto-resistive current sensor. The process of the above-noted EXAMPLE where the current sensor is implemented as a shunt resistor. The process of the above-noted EXAMPLE where the current sensor is configured to detect an overcurrent; where the current sensor is configured to generate an overcurrent signal in response to an overcurrent; where the control and sensing circuit is configured to generate and send a control signal to the gate driver in response to the overcurrent signal; where the gate driver is configured to generate a gate driver signal in response to the control signal; where the at least one power device is configured to turn off in response to the gate driver signal; and where turning off the at least one power device disconnects the power source from the load. The process of the above-noted EXAMPLE includes providing a first power source input and a first power load output, where the first power source input is electrically connected to the at least one power device to provide power to the at least one power device from the power source; and where the first power load output is electrically connected to the current limiter. The process of the above-noted EXAMPLE where the at least one power device is a MOSFET (Metal-Oxide-Semiconductor Field-Effect Transistor), an IGBT (Insulated-Gate Bipolar Transistor), a silicon MOSFET, a silicon IGBT, a silicon carbide MOSFET, and/or a silicon carbide IGBT. The process of the above-noted EXAMPLE where the at least one power device implemented as a MOSFET having a diode arranged in parallel. The process of the above-noted EXAMPLE includes: providing at least one second power device; providing a second current sensor; providing a second parasitic inductance component; and configuring the second parasitic inductance component to limit a rate of current change (di/dt) during a fault. The process of the above-noted EXAMPLE where the current limiter and/or the second parasitic inductance component are configured, structured, and/or implemented to increase parasitic inductance in a gate drive of the at least one second power device. The process of the above-noted EXAMPLE where the current limiter and/or the second parasitic inductance component are configured, structured, and/or implemented to increase parasitic component in a gate drive of the at least one second power device to limit a rate of current change (di/dt) during a fault. The process of the above-noted EXAMPLE where the current limiter and/or the second parasitic inductance component are configured such that a voltage drop across the second parasitic inductance component counters a gate voltage increase of the at least one second power device. The process of the above-noted EXAMPLE where the current limiter and/or the second parasitic inductance component are configured to reduce a likelihood of damage to circuits, devices, components, and/or equipment of the device. The process of the above-noted EXAMPLE where the device is configured as a bi-directional device. The process of the above-noted EXAMPLE where the second parasitic inductance component is implemented as a printed circuit board (PCB) trace. The process of the above-noted EXAMPLE where the second parasitic inductance component is implemented as a copper plate. The process of the above-noted EXAMPLE where the second parasitic inductance component has an inductance of less than 100 nH. The process of the above-noted EXAMPLE where the second parasitic inductance component has an inductance of 5 nH to 100 nH. The process of the above-noted EXAMPLE where the second parasitic inductance component is configured as a metallic trace, a metallic plate, a metallic coil, and/or a spiral metallic configuration. The process of the above-noted EXAMPLE where the second parasitic inductance component is structured and arranged on a circuit substrate, in or with the second current sensor, and/or in or on a printed circuit board. The process of the above-noted EXAMPLE where the second parasitic inductance component is part of the second current sensor implemented as a current shunt. The process of the above-noted EXAMPLE where the second parasitic inductance component is configured to limit current and/or limit a rate of current change (di/dt) within the device and protect the device from damage. The process of the above-noted EXAMPLE where the current limiter and/or the second parasitic inductance component is configured to limit a current within and/or limit a rate of current change (di/dt) within the device and prevent damage to components of the device including the at least one second power device. The process of the above-noted EXAMPLE where the second parasitic inductance component and the second current sensor are configured as separate components. The process of the above-noted EXAMPLE where the second current sensor and the second parasitic inductance component are integrated. The process of the above-noted EXAMPLE where the second current sensor comprises the second parasitic inductance component. The process of the above-noted EXAMPLE where the second parasitic inductance component is the second current sensor implemented as a current shunt. The process of the above-noted EXAMPLE where the power source comprises a DC power source or an AC power source. The process of the above-noted EXAMPLE where the second current sensor is implemented as a shunt resistor, a current transformer, a Rogowski coil, a magnetic field sensor, a fluxgate sensor, and/or a magneto-resistive second current sensor. The process of the above-noted EXAMPLE where the second current sensor is implemented as a shunt resistor.

One EXAMPLE: a device includes at least one power device. The device in addition includes a gate driver. The breaker moreover includes a control and sensing circuit. The breaker also includes a current sensor. The breaker further includes a current limiter that comprises a parasitic inductance component configured to reduce a likelihood of damage to circuits, devices, and/or components of the device.

The breaker in addition includes where the device is configured to be implemented in a system that comprises a load and a power source.

The above-noted EXAMPLE may further include any one or a combination of more than one of the following EXAMPLES: The device of the above-noted EXAMPLE where the current limiter and/or the parasitic inductance component are configured, structured, and/or implemented to increase parasitic inductance in a gate drive of the at least one power device. The device of the above-noted EXAMPLE where the current limiter and/or the parasitic inductance component are configured, structured, and/or implemented to increase parasitic inductance in a gate drive of the at least one power device to limit a rate of current change (di/dt) during a fault. The device of the above-noted EXAMPLE where the current limiter and/or the parasitic inductance component are configured such that a voltage drop across the parasitic inductance component counters a gate voltage increase of the at least one power device. The device of the above-noted EXAMPLE where the parasitic inductance component is configured, structured, and/or implemented to limit a rate of current change (di/dt) during a fault. The device of the above-noted EXAMPLE where the device is configured as an uni-directional device. The device of the above-noted EXAMPLE where the parasitic inductance component is implemented as a printed circuit board (PCB) trace. The device of the above-noted EXAMPLE where the parasitic inductance component is implemented as a copper plate. The device of the above-noted EXAMPLE where the parasitic inductance component has an inductance of less than 100 nH. The device of the above-noted EXAMPLE where the parasitic inductance component has an inductance of 5 nH to 100 nH. The device of the above-noted EXAMPLE where the parasitic inductance component is configured as a metallic trace, a metallic plate, a metallic coil, and/or a spiral metallic configuration. The device of the above-noted EXAMPLE where the parasitic inductance component is structured and arranged on a circuit substrate, in or with the current sensor, and/or in or on a printed circuit board. The device of the above-noted EXAMPLE where the parasitic inductance component is part of the current sensor implemented as a current shunt. The device of the above-noted EXAMPLE where the parasitic inductance component is configured to limit current and/or limit a rate of current change (di/dt) within the device and protect the device from damage. The device of the above-noted EXAMPLE where the current limiter and/or the parasitic inductance component are configured to limit a current within and/or limit a rate of current change (di/dt) within the device and prevent damage to components of the device including the at least one power device. The device of the above-noted EXAMPLE where the parasitic inductance component and the current sensor are configured as separate components. The device of the above-noted EXAMPLE where the current sensor and the parasitic inductance component are integrated. The device of the above-noted EXAMPLE where the current sensor comprises the parasitic inductance component. The device of the above-noted EXAMPLE where the parasitic inductance component is the current sensor implemented as a current shunt. The device of the above-noted EXAMPLE where the power source comprises a DC power source or an AC power source. The device of the above-noted EXAMPLE where the current sensor is implemented as a shunt resistor, a current transformer, a Rogowski coil, a magnetic field sensor, a fluxgate sensor, and/or a magneto-resistive current sensor. The device of the above-noted EXAMPLE where the current sensor is implemented as a shunt resistor. The device of the above-noted EXAMPLE where the current sensor is configured to detect an overcurrent; where the current sensor is configured to generate an overcurrent signal in response to an overcurrent; where the control and sensing circuit is configured to generate and send a control signal to the gate driver in response to the overcurrent signal; where the gate driver is configured to generate a gate driver signal in response to the control signal; where the at least one power device is configured to turn off in response to the gate driver signal; and where turning off the at least one power device disconnects the power source from the load. The device of the above-noted EXAMPLE includes a first power source input and a first power load output, where the first power source input is electrically connected to the at least one power device to provide power to the at least one power device from the power source; and where the first power load output is electrically connected to the current limiter. The device of the above-noted EXAMPLE where the at least one power device is a MOSFET (Metal-Oxide-Semiconductor Field-Effect Transistor), an IGBT (Insulated-Gate Bipolar Transistor), a silicon MOSFET, a silicon IGBT, a silicon carbide MOSFET, and/or a silicon carbide IGBT. The device of the above-noted EXAMPLE where the at least one power device implemented as a MOSFET having a diode arranged in parallel. The device of the above-noted EXAMPLE includes: at least one second power device; a second current sensor; and a second parasitic inductance component, where the second parasitic inductance component is configured, structured, and/or implemented to limit a rate of current change (di/dt) during a fault. The device of the above-noted EXAMPLE where the current limiter and/or the second parasitic inductance component are configured, structured, and/or implemented to increase parasitic inductance in a gate drive of the at least one second power device. The device of the above-noted EXAMPLE where the current limiter and/or the second parasitic inductance component are configured, structured, and/or implemented to increase parasitic inductance in a gate drive of the at least one second power device to limit a rate of current change (di/dt) during a fault. The device of the above-noted EXAMPLE where the current limiter and/or the second parasitic inductance component are configured such that a voltage drop across the second parasitic inductance component counters a gate voltage increase of the at least one second power device. The device of the above-noted EXAMPLE where the current limiter and/or the second parasitic inductance component are configured to reduce a likelihood of damage to circuits, devices, components, and/or equipment of the device. The device of the above-noted EXAMPLE where the device is configured as a bi-directional device. The device of the above-noted EXAMPLE where the second parasitic inductance component is implemented as a printed circuit board (PCB) trace. The device of the above-noted EXAMPLE where the second parasitic inductance component is implemented as a copper plate. The device of the above-noted EXAMPLE where the second parasitic inductance component has an inductance of less than 100 nH. The device of the above-noted EXAMPLE where the second parasitic inductance component has an inductance of 5 nH to 100 nH. The device of the above-noted EXAMPLE where the second parasitic inductance component is configured as a metallic trace, a metallic plate, a metallic coil, and/or a spiral metallic configuration. The device of the above-noted EXAMPLE where the second parasitic inductance component is structured and arranged on a circuit substrate, in or with the second current sensor, and/or in or on a printed circuit board.

The device of the above-noted EXAMPLE where the second parasitic inductance component is part of the second current sensor implemented as a current shunt. The device of the above-noted EXAMPLE where the second parasitic inductance component is configured to limit current and/or limit a rate of current change (di/dt) within the device and protect the device from damage. The device of the above-noted EXAMPLE where the current limiter and/or the second parasitic inductance component is configured to limit a current within and/or limit a rate of current change (di/dt) within the device and prevent damage to components of the device including the at least one second power device. The device of the above-noted EXAMPLE where the second parasitic inductance component and the second current sensor are configured as separate components. The device of the above-noted EXAMPLE where the second current sensor and the second parasitic inductance component are integrated. The device of the above-noted EXAMPLE where the second current sensor comprises the second parasitic inductance component. The device of the above-noted EXAMPLE where the second parasitic inductance component is the second current sensor implemented as a current shunt. The device of the above-noted EXAMPLE where the power source comprises a DC power source or an AC power source. The device of the above-noted EXAMPLE where the second current sensor is implemented as a shunt resistor, a current transformer, a Rogowski coil, a magnetic field sensor, a fluxgate sensor, and/or a magneto-resistive second current sensor. The device of the above-noted EXAMPLE where the second current sensor is implemented as a shunt resistor.

One EXAMPLE: a process includes providing at least one power device. The process in addition includes providing a gate driver. The process moreover includes providing a control and sensing circuit. The process also includes providing a current sensor. The process further includes providing a current limiter that comprises a parasitic inductance component configured to reduce a likelihood of damage to circuits, devices, and/or components of the device. The process in addition includes where the device is configured to be implemented in a system that comprises a load and a power source.

The above-noted EXAMPLE may further include any one or a combination of more than one of the following EXAMPLES: The process of the above-noted EXAMPLE where the current limiter and/or the parasitic inductance component are configured, structured, and/or implemented to increase parasitic inductance in a gate drive of the at least one power device. The process of the above-noted EXAMPLE where the current limiter and/or the parasitic inductance component are configured, structured, and/or implemented to increase parasitic inductance in a gate drive of the at least one power device to limit a rate of current change (di/dt) during a fault. The process of the above-noted EXAMPLE where the current limiter and/or the parasitic inductance component are configured such that a voltage drop across the parasitic inductance component counters a gate voltage increase of the at least one power device. The process of the above-noted EXAMPLE includes configuring the parasitic inductance component to limit a rate of current change (di/dt) during a fault. The process of the above-noted EXAMPLE where the device is configured as a uni-directional device. The process of the above-noted EXAMPLE where the parasitic inductance component is implemented as a printed circuit board (PCB) trace. The process of the above-noted EXAMPLE where the parasitic inductance component is implemented as a copper plate. The process of the above-noted EXAMPLE where the parasitic inductance component has an inductance of less than 100 nH. The process of the above-noted EXAMPLE where the parasitic inductance component has an inductance of 5 nH to 100 nH. The process of the above-noted EXAMPLE where the parasitic inductance component is configured as a metallic trace, a metallic plate, a metallic coil, and/or a spiral metallic configuration. The process of the above-noted EXAMPLE where the parasitic inductance component is structured and arranged on a circuit substrate, in or with the current sensor, and/or in or on a printed circuit board. The process of the above-noted EXAMPLE where the parasitic inductance component is part of the current sensor implemented as a current shunt. The process of the above-noted EXAMPLE where the parasitic inductance component is configured to limit current and/or limit a rate of current change (di/dt) within the device and protect the device from damage. The process of the above-noted EXAMPLE where the current limiter and/or the parasitic inductance component are configured to limit a current within and/or limit a rate of current change (di/dt) within the device and prevent damage to components of the device including the at least one power device. The process of the above-noted EXAMPLE where the parasitic inductance component and the current sensor are configured as separate components. The process of the above-noted EXAMPLE where the current sensor and the parasitic inductance component are integrated. The process of the above-noted EXAMPLE where the current sensor comprises the parasitic inductance component. The process of the above-noted EXAMPLE where the parasitic inductance component is the current sensor implemented as a current shunt. The process of the above-noted EXAMPLE where the power source comprises a DC power source or an AC power source. The process of the above-noted EXAMPLE where the current sensor is implemented as a shunt resistor, a current transformer, a Rogowski coil, a magnetic field sensor, a fluxgate sensor, and/or a magneto-resistive current sensor. The process of the above-noted EXAMPLE where the current sensor is implemented as a shunt resistor. The process of the above-noted EXAMPLE where the current sensor is configured to detect an overcurrent; where the current sensor is configured to generate an overcurrent signal in response to an overcurrent; where the control and sensing circuit is configured to generate and send a control signal to the gate driver in response to the overcurrent signal; where the gate driver is configured to generate a gate driver signal in response to the control signal; where the at least one power device is configured to turn off in response to the gate driver signal; and where turning off the at least one power device disconnects the power source from the load. The process of the above-noted EXAMPLE includes providing a first power source input and a first power load output, where the first power source input is electrically connected to the at least one power device to provide power to the at least one power device from the power source; and where the first power load output is electrically connected to the current limiter. The process of the above-noted EXAMPLE where the at least one power device is a MOSFET (Metal-Oxide-Semiconductor Field-Effect Transistor), an IGBT (Insulated-Gate Bipolar Transistor), a silicon MOSFET, a silicon IGBT, a silicon carbide MOSFET, and/or a silicon carbide IGBT. The process of the above-noted EXAMPLE where the at least one power device implemented as a MOSFET having a diode arranged in parallel. The process of the above-noted EXAMPLE includes: providing at least one second power device; providing a second current sensor; providing a second parasitic inductance component; and configuring the second parasitic inductance component to limit a rate of current change (di/dt) during a fault. The process of the above-noted EXAMPLE where the current limiter and/or the second parasitic inductance component are configured, structured, and/or implemented to increase parasitic inductance in a gate drive of the at least one second power device. The process of the above-noted EXAMPLE where the current limiter and/or the second parasitic inductance component are configured, structured, and/or implemented to increase parasitic component in a gate drive of the at least one second power device to limit a rate of current change (di/dt) during a fault. The process of the above-noted EXAMPLE where the current limiter and/or the second parasitic inductance component are configured such that a voltage drop across the second parasitic inductance component counters a gate voltage increase of the at least one second power device. The process of the above-noted EXAMPLE where the current limiter and/or the second parasitic inductance component are configured to reduce a likelihood of damage to circuits, devices, components, and/or equipment of the device. The process of the above-noted EXAMPLE where the device is configured as a bi-directional device. The process of the above-noted EXAMPLE where the second parasitic inductance component is implemented as a printed circuit board (PCB) trace. The process of the above-noted EXAMPLE where the second parasitic inductance component is implemented as a copper plate. The process of the above-noted EXAMPLE where the second parasitic inductance component has an inductance of less than 100 nH. The process of the above-noted EXAMPLE where the second parasitic inductance component has an inductance of 5 nH to 100 nH. The process of the above-noted EXAMPLE where the second parasitic inductance component is configured as a metallic trace, a metallic plate, a metallic coil, and/or a spiral metallic configuration. The process of the above-noted EXAMPLE where the second parasitic inductance component is structured and arranged on a circuit substrate, in or with the second current sensor, and/or in or on a printed circuit board. The process of the above-noted EXAMPLE where the second parasitic inductance component is part of the second current sensor implemented as a current shunt. The process of the above-noted EXAMPLE where the second parasitic inductance component is configured to limit current and/or limit a rate of current change (di/dt) within the device and protect the device from damage. The process of the above-noted EXAMPLE where the current limiter and/or the second parasitic inductance component is configured to limit a current within and/or limit a rate of current change (di/dt) within the device and prevent damage to components of the device including the at least one second power device. The process of the above-noted EXAMPLE where the second parasitic inductance component and the second current sensor are configured as separate components. The process of the above-noted EXAMPLE where the second current sensor and the second parasitic inductance component are integrated. The process of the above-noted EXAMPLE where the second current sensor comprises the second parasitic inductance component. The process of the above-noted EXAMPLE where the second parasitic inductance component is the second current sensor implemented as a current shunt. The process of the above-noted EXAMPLE where the power source comprises a DC power source or an AC power source. The process of the above-noted EXAMPLE where the second current sensor is implemented as a shunt resistor, a current transformer, a Rogowski coil, a magnetic field sensor, a fluxgate sensor, and/or a magneto-resistive second current sensor. The process of the above-noted EXAMPLE where the second current sensor is implemented as a shunt resistor.

One EXAMPLE: a device includes at least one power device. The device in addition includes a gate driver. The breaker moreover includes a control and sensing circuit. The breaker also includes a current sensor. The breaker further includes a current limiter that comprises a parasitic inductance component configured to limit a current within and/or limit a rate of current change (di/dt) within the device. The breaker in addition includes where the device is configured to be implemented in a system that comprises a load and a power source.

The above-noted EXAMPLE may further include any one or a combination of more than one of the following EXAMPLES: The device of the above-noted EXAMPLE where the current limiter and/or the parasitic inductance component are configured, structured, and/or implemented to increase parasitic inductance in a gate drive of the at least one power device. The device of the above-noted EXAMPLE where the current limiter and/or the parasitic inductance component are configured, structured, and/or implemented to increase parasitic inductance in a gate drive of the at least one power device to limit a rate of current change (di/dt) during a fault. The device of the above-noted EXAMPLE where the current limiter and/or the parasitic inductance component are configured such that a voltage drop across the parasitic inductance component counters a gate voltage increase of the at least one power device. The device of the above-noted EXAMPLE where the current limiter and/or the parasitic inductance component are configured to reduce a likelihood of damage to circuits, devices, components, and/or equipment of the device. The device of the above-noted EXAMPLE where the device is configured as an uni-directional device. The device of the above-noted EXAMPLE where the parasitic inductance component is implemented as a printed circuit board (PCB) trace. The device of the above-noted EXAMPLE where the parasitic inductance component is implemented as a copper plate. The device of the above-noted EXAMPLE where the parasitic inductance component has an inductance of less than 100 nH. The device of the above-noted EXAMPLE where the parasitic inductance component has an inductance of 5 nH to 100 nH. The device of the above-noted EXAMPLE where the parasitic inductance component is configured as a metallic trace, a metallic plate, a metallic coil, and/or a spiral metallic configuration. The device of the above-noted EXAMPLE where the parasitic inductance component is structured and arranged on a circuit substrate, in or with the current sensor, and/or in or on a printed circuit board. The device of the above-noted EXAMPLE where the parasitic inductance component is part of the current sensor implemented as a current shunt. The device of the above-noted EXAMPLE where the parasitic inductance component is configured, structured, and/or implemented to limit a rate of current change (di/dt) during a fault. The device of the above-noted EXAMPLE where the current limiter and/or the parasitic inductance component are configured to limit a current within and/or limit a rate of current change (di/dt) within the device and prevent damage to components of the device including the at least one power device. The device of the above-noted EXAMPLE where the parasitic inductance component and the current sensor are configured as separate components. The device of the above-noted EXAMPLE where the current sensor and the parasitic inductance component are integrated. The device of the above-noted EXAMPLE where the current sensor comprises the parasitic inductance component. The device of the above-noted EXAMPLE where the parasitic inductance component is the current sensor implemented as a current shunt. The device of the above-noted EXAMPLE where the power source comprises a DC power source or an AC power source. The device of the above-noted EXAMPLE where the current sensor is implemented as a shunt resistor, a current transformer, a Rogowski coil, a magnetic field sensor, a fluxgate sensor, and/or a magneto-resistive current sensor. The device of the above-noted EXAMPLE where the current sensor is implemented as a shunt resistor. The device of the above-noted EXAMPLE where the current sensor is configured to detect an overcurrent; where the current sensor is configured to generate an overcurrent signal in response to an overcurrent; where the control and sensing circuit is configured to generate and send a control signal to the gate driver in response to the overcurrent signal; where the gate driver is configured to generate a gate driver signal in response to the control signal; where the at least one power device is configured to turn off in response to the gate driver signal; and where turning off the at least one power device disconnects the power source from the load. The device of the above-noted EXAMPLE includes a first power source input and a first power load output, where the first power source input is electrically connected to the at least one power device to provide power to the at least one power device from the power source; and where the first power load output is electrically connected to the current limiter. The device of the above-noted EXAMPLE where the at least one power device is a MOSFET (Metal-Oxide-Semiconductor Field-Effect Transistor), an IGBT (Insulated-Gate Bipolar Transistor), a silicon MOSFET, a silicon IGBT, a silicon carbide MOSFET, and/or a silicon carbide IGBT. The device of the above-noted EXAMPLE where the at least one power device implemented as a MOSFET having a diode arranged in parallel. The device of the above-noted EXAMPLE includes: at least one second power device; a second current sensor; and a second parasitic inductance component, where the second parasitic inductance component is configured, structured, and/or implemented to limit a rate of current change (di/dt) during a fault. The device of the above-noted EXAMPLE where the current limiter and/or the second parasitic inductance component are configured, structured, and/or implemented to increase parasitic inductance in a gate drive of the at least one second power device. The device of the above-noted EXAMPLE where the current limiter and/or the second parasitic inductance component are configured, structured, and/or implemented to increase parasitic inductance in a gate drive of the at least one second power device to limit a rate of current change (di/dt) during a fault. The device of the above-noted EXAMPLE where the current limiter and/or the second parasitic inductance component are configured such that a voltage drop across the second parasitic inductance component counters a gate voltage increase of the at least one second power device. The device of the above-noted EXAMPLE where the current limiter and/or the second parasitic inductance component are configured to reduce a likelihood of damage to circuits, devices, components, and/or equipment of the device. The device of the above-noted EXAMPLE where the device is configured as a bi-directional device. The device of the above-noted EXAMPLE where the second parasitic inductance component is implemented as a printed circuit board (PCB) trace. The device of the above-noted EXAMPLE where the second parasitic inductance component is implemented as a copper plate. The device of the above-noted EXAMPLE where the second parasitic inductance component has an inductance of less than 100 nH. The device of the above-noted EXAMPLE where the second parasitic inductance component has an inductance of 5 nH to 100 nH. The device of the above-noted EXAMPLE where the second parasitic inductance component is configured as a metallic trace, a metallic plate, a metallic coil, and/or a spiral metallic configuration. The device of the above-noted EXAMPLE where the second parasitic inductance component is structured and arranged on a circuit substrate, in or with the second current sensor, and/or in or on a printed circuit board. The device of the above-noted EXAMPLE where the second parasitic inductance component is part of the second current sensor implemented as a current shunt. The device of the above-noted EXAMPLE where the second parasitic inductance component is configured to limit current and/or limit a rate of current change (di/dt) within the device and protect the device from damage. The device of the above-noted EXAMPLE where the current limiter and/or the second parasitic inductance component is configured to limit a current within and/or limit a rate of current change (di/dt) within the device and prevent damage to components of the device including the at least one second power device. The device of the above-noted EXAMPLE where the second parasitic inductance component and the second current sensor are configured as separate components. The device of the above-noted EXAMPLE where the second current sensor and the second parasitic inductance component are integrated. The device of the above-noted EXAMPLE where the second current sensor comprises the second parasitic inductance component. The device of the above-noted EXAMPLE where the second parasitic inductance component is the second current sensor implemented as a current shunt. The device of the above-noted EXAMPLE where the power source comprises a DC power source or an AC power source. The device of the above-noted EXAMPLE where the second current sensor is implemented as a shunt resistor, a current transformer, a Rogowski coil, a magnetic field sensor, a fluxgate sensor, and/or a magneto-resistive second current sensor. The device of the above-noted EXAMPLE where the second current sensor is implemented as a shunt resistor.

One EXAMPLE: a process includes providing at least one power device. The process in addition includes providing a gate driver. The process moreover includes providing a control and sensing circuit. The process also includes providing a current sensor. The process further includes providing a current limiter that comprises a parasitic inductance component configured to limit a current within and/or limit a rate of current change (di/dt) within the device. The process in addition includes where the device is configured to be implemented in a system that comprises a load and a power source.

The above-noted EXAMPLE may further include any one or a combination of more than one of the following EXAMPLES: The process of the above-noted EXAMPLE where the current limiter and/or the parasitic inductance component are configured, structured, and/or implemented to increase parasitic inductance in a gate drive of the at least one power device. The process of the above-noted EXAMPLE where the current limiter and/or the parasitic inductance component are configured, structured, and/or implemented to increase parasitic inductance in a gate drive of the at least one power device to limit a rate of current change (di/dt) during a fault. The process of the above-noted EXAMPLE where the current limiter and/or the parasitic inductance component are configured such that a voltage drop across the parasitic inductance component counters a gate voltage increase of the at least one power device. The process of the above-noted EXAMPLE where the current limiter and/or the parasitic inductance component are configured to reduce a likelihood of damage to circuits, devices, components, and/or equipment of the device. The process of the above-noted EXAMPLE where the device is configured as a uni-directional device. The process of the above-noted EXAMPLE where the parasitic inductance component is implemented as a printed circuit board (PCB) trace. The process of the above-noted EXAMPLE where the parasitic inductance component is implemented as a copper plate. The process of the above-noted EXAMPLE where the parasitic inductance component has an inductance of less than 100 nH. The process of the above-noted EXAMPLE where the parasitic inductance component has an inductance of 5 nH to 100 nH. The process of the above-noted EXAMPLE where the parasitic inductance component is configured as a metallic trace, a metallic plate, a metallic coil, and/or a spiral metallic configuration. The process of the above-noted EXAMPLE where the parasitic inductance component is structured and arranged on a circuit substrate, in or with the current sensor, and/or in or on a printed circuit board. The process of the above-noted EXAMPLE where the parasitic inductance component is part of the current sensor implemented as a current shunt. The process of the above-noted EXAMPLE includes configuring the parasitic inductance component to limit a rate of current change (di/dt) during a fault. The process of the above-noted EXAMPLE where the current limiter and/or the parasitic inductance component are configured to limit a current within and/or limit a rate of current change (di/dt) within the device and prevent damage to components of the device including the at least one power device. The process of the above-noted EXAMPLE where the parasitic inductance component and the current sensor are configured as separate components. The process of the above-noted EXAMPLE where the current sensor and the parasitic inductance component are integrated. The process of the above-noted EXAMPLE where the current sensor comprises the parasitic inductance component. The process of the above-noted EXAMPLE where the parasitic inductance component is the current sensor implemented as a current shunt. The process of the above-noted EXAMPLE where the power source comprises a DC power source or an AC power source. The process of the above-noted EXAMPLE where the current sensor is implemented as a shunt resistor, a current transformer, a Rogowski coil, a magnetic field sensor, a fluxgate sensor, and/or a magneto-resistive current sensor. The process of the above-noted EXAMPLE where the current sensor is implemented as a shunt resistor. The process of the above-noted EXAMPLE where the current sensor is configured to detect an overcurrent; where the current sensor is configured to generate an overcurrent signal in response to an overcurrent; where the control and sensing circuit is configured to generate and send a control signal to the gate driver in response to the overcurrent signal; where the gate driver is configured to generate a gate driver signal in response to the control signal; where the at least one power device is configured to turn off in response to the gate driver signal; and where turning off the at least one power device disconnects the power source from the load. The process of the above-noted EXAMPLE includes providing a first power source input and a first power load output, where the first power source input is electrically connected to the at least one power device to provide power to the at least one power device from the power source; and where the first power load output is electrically connected to the current limiter. The process of the above-noted EXAMPLE where the at least one power device is a MOSFET (Metal-Oxide-Semiconductor Field-Effect Transistor), an IGBT (Insulated-Gate Bipolar Transistor), a silicon MOSFET, a silicon IGBT, a silicon carbide MOSFET, and/or a silicon carbide IGBT. The process of the above-noted EXAMPLE where the at least one power device implemented as a MOSFET having a diode arranged in parallel. The process of the above-noted EXAMPLE includes: providing at least one second power device; providing a second current sensor; providing a second parasitic inductance component; and configuring the second parasitic inductance component to limit a rate of current change (di/dt) during a fault. The process of the above-noted EXAMPLE where the current limiter and/or the second parasitic inductance component are configured, structured, and/or implemented to increase parasitic inductance in a gate drive of the at least one second power device. The process of the above-noted EXAMPLE where the current limiter and/or the second parasitic inductance component are configured, structured, and/or implemented to increase parasitic component in a gate drive of the at least one second power device to limit a rate of current change (di/dt) during a fault. The process of the above-noted EXAMPLE where the current limiter and/or the second parasitic inductance component are configured such that a voltage drop across the second parasitic inductance component counters a gate voltage increase of the at least one second power device. The process of the above-noted EXAMPLE where the current limiter and/or the second parasitic inductance component are configured to reduce a likelihood of damage to circuits, devices, components, and/or equipment of the device. The process of the above-noted EXAMPLE where the device is configured as a bi-directional device. The process of the above-noted EXAMPLE where the second parasitic inductance component is implemented as a printed circuit board (PCB) trace. The process of the above-noted EXAMPLE where the second parasitic inductance component is implemented as a copper plate. The process of the above-noted EXAMPLE where the second parasitic inductance component has an inductance of less than 100 nH. The process of the above-noted EXAMPLE where the second parasitic inductance component has an inductance of 5 nH to 100 nH. The process of the above-noted EXAMPLE where the second parasitic inductance component is configured as a metallic trace, a metallic plate, a metallic coil, and/or a spiral metallic configuration. The process of the above-noted EXAMPLE where the second parasitic inductance component is structured and arranged on a circuit substrate, in or with the second current sensor, and/or in or on a printed circuit board. The process of the above-noted EXAMPLE where the second parasitic inductance component is part of the second current sensor implemented as a current shunt. The process of the above-noted EXAMPLE where the second parasitic inductance component is configured to limit current and/or limit a rate of current change (di/dt) within the device and protect the device from damage. The process of the above-noted EXAMPLE where the current limiter and/or the second parasitic inductance component is configured to limit a current within and/or limit a rate of current change (di/dt) within the device and prevent damage to components of the device including the at least one second power device. The process of the above-noted EXAMPLE where the second parasitic inductance component and the second current sensor are configured as separate components. The process of the above-noted EXAMPLE where the second current sensor and the second parasitic inductance component are integrated. The process of the above-noted EXAMPLE where the second current sensor comprises the second parasitic inductance component. The process of the above-noted EXAMPLE where the second parasitic inductance component is the second current sensor implemented as a current shunt. The process of the above-noted EXAMPLE where the power source comprises a DC power source or an AC power source. The process of the above-noted EXAMPLE where the second current sensor is implemented as a shunt resistor, a current transformer, a Rogowski coil, a magnetic field sensor, a fluxgate sensor, and/or a magneto-resistive second current sensor. The process of the above-noted EXAMPLE where the second current sensor is implemented as a shunt resistor.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto another element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over another element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A device comprising:
   at least one power device;
   a gate driver;
   a control and sensing circuit;
   a current sensor; and
   a current limiter that comprises a parasitic inductance component,
   wherein the parasitic inductance component is configured, structured, and/or implemented to limit a rate of current change (di/dt) during a fault;
   wherein the device is configured to be implemented in a system that comprises a load and a power source; and
   wherein the current limiter and/or the parasitic inductance component are configured, structured, and/or implemented to increase parasitic inductance in a gate drive loop of the at least one power device to limit a rate of current change (di/dt) during a fault.

2. The device according to claim 1, wherein the current limiter and/or the parasitic inductance component are configured such that a voltage drop across the parasitic inductance component counters a gate voltage increase of the at least one power device.

3. The device according to claim 1, wherein the current limiter and/or the parasitic inductance component are configured to reduce a likelihood of damage to circuits, devices, components, and/or equipment of the device.

4. The device according to claim 1, wherein the device is configured as a uni-directional device.

5. The device according to claim 1, wherein the parasitic inductance component is implemented as a printed circuit board (PCB) trace.

6. The device according to claim 1, wherein the parasitic inductance component is implemented as a copper plate.

7. The device according to claim 1, wherein the parasitic inductance component has an inductance of less than 100 nH.

8. The device according to claim 1, wherein the parasitic inductance component has an inductance of 5 nH to 100 nH.

9. The device according to claim 1, wherein the parasitic inductance component is configured as a metallic trace, a metallic plate, a metallic coil, and/or a spiral metallic configuration.

10. The device according to claim 1, wherein the parasitic inductance component is structured and arranged on a circuit substrate, in or with the current sensor, and/or in or on a printed circuit board.

11. The device according to claim 1, wherein the parasitic inductance component is part of the current sensor implemented as a current shunt.

12. The device according to claim 1, wherein the parasitic inductance component is configured to limit current and/or limit a rate of current change (di/dt) within the device and protect the device from damage.

13. The device according to claim 1, wherein the current limiter and/or the parasitic inductance component are configured to limit a current within and/or limit a rate of current change (di/dt) within the device and prevent damage to components of the device including the at least one power device.

14. The device according to claim 1, wherein the parasitic inductance component and the current sensor are configured as separate components.

15. The device according to claim 1, wherein the current sensor and the parasitic inductance component are integrated.

16. The device according to claim 1, wherein the current sensor comprises the parasitic inductance component.

17. The device according to claim 1, wherein the parasitic inductance component is the current sensor implemented as a current shunt.

18. The device according to claim 1, wherein the power source comprises a DC power source or an AC power source.

19. The device according to claim 1, wherein the current sensor is implemented as a shunt resistor, a current transformer, a Rogowski coil, a magnetic field sensor, a fluxgate sensor, and/or a magneto-resistive current sensor.

20. The device according to claim 1, wherein the current sensor is implemented as a shunt resistor.

21. The device according to claim 1,
wherein the current sensor is configured to detect an overcurrent;
wherein the current sensor is configured to generate an overcurrent signal in response to an overcurrent;
wherein the control and sensing circuit is configured to generate and send a control signal to the gate driver in response to the overcurrent signal;
wherein the gate driver is configured to generate a gate driver signal in response to the control signal;
wherein the at least one power device is configured to turn off in response to the gate driver signal; and
wherein turning off the at least one power device disconnects the power source from the load.

22. The device according to claim 1, further comprising a first power source input and a first power load output,
wherein the first power source input is electrically connected to the at least one power device to provide power to the at least one power device from the power source; and
wherein the first power load output is electrically connected to the current limiter.

23. The device according to claim 1, wherein the at least one power device is a MOSFET (Metal-Oxide-Semiconductor Field-Effect Transistor), an IGBT (Insulated-Gate Bipolar Transistor), a silicon MOSFET, a silicon IGBT, a silicon carbide MOSFET, and/or a silicon carbide IGBT.

24. The device according to claim 1, wherein the at least one power device implemented as a MOSFET having a diode arranged in parallel.

25. The device according to claim 1, further comprising:
at least one second power device;
a second current sensor; and
a second parasitic inductance component,
wherein the second parasitic inductance component is configured, structured, and/or implemented to limit a rate of current change (di/dt) during a fault.

26. A device comprising:
at least one power device;
a gate driver;
a control and sensing circuit;
a current sensor; and
a current limiter that comprises a parasitic inductance component configured, to increase parasitic inductance in a gate drive of the at least one power device,
wherein the device is configured to be implemented in a system that comprises a load and a power source; and
wherein the current limiter and/or the parasitic inductance component are configured, structured, and/or implemented to increase parasitic inductance in a gate drive loop of the at least one power device to limit a rate of current change (di/dt) during a fault.

27. The device according to claim 26, wherein the current limiter and/or the parasitic inductance component are configured such that a voltage drop across the parasitic inductance component counters a gate voltage increase of the at least one power device.

28. The device according to claim 26, wherein the parasitic inductance component is implemented as a printed circuit board (PCB) trace.

29. The device according to claim 26, wherein the parasitic inductance component is implemented as a copper plate.

30. The device according to claim 26, wherein the parasitic inductance component has an inductance of less than 100 nH.

31. The device according to claim 26, wherein the parasitic inductance component has an inductance of 5 nH to 100 nH.

32. The device according to claim 26, wherein the parasitic inductance component is configured as a metallic trace, a metallic plate, a metallic coil, and/or a spiral metallic configuration.

33. The device according to claim 26, wherein the parasitic inductance component is structured and arranged on a circuit substrate, in or with the current sensor, and/or in or on a printed circuit board.

34. The device according to claim 26, wherein the parasitic inductance component is part of the current sensor implemented as a current shunt.

35. The device according to claim 26, wherein the parasitic inductance component and the current sensor are configured as separate components.

36. The device according to claim 26, wherein the current sensor and the parasitic inductance component are integrated.

37. The device according to claim 26, wherein the current sensor comprises the parasitic inductance component.

38. The device according to claim 26, wherein the parasitic inductance component is the current sensor implemented as a current shunt.

39. The device according to claim 26, wherein the current sensor is implemented as a shunt resistor.

40. The device according to claim 26, further comprising:
at least one second power device;
a second current sensor; and
a second parasitic inductance component,
wherein the second parasitic inductance component is configured, structured, and/or implemented to limit a rate of current change (di/dt) during a fault.

41. A device comprising:
at least one power device;
a gate driver;
a control and sensing circuit;
a current sensor; and a current limiter that comprises a parasitic inductance component configured to reduce a likelihood of damage to circuits, devices, and/or components of the device, wherein the device is configured to be implemented in a system that comprises a load and a power source; and wherein the current limiter and/or the parasitic inductance component are configured, structured, and/or implemented to increase parasitic inductance in a gate drive loop of the at least one power device to limit a rate of current change (di/dt) during a fault.

42. The device according to claim 41, wherein the current limiter and/or the parasitic inductance component are configured, structured, and/or implemented to increase parasitic inductance in a gate drive of the at least one power device.

43. The device according to claim 41, wherein the current limiter and/or the parasitic inductance component are configured, structured, and/or implemented to increase parasitic inductance in a gate drive of the at least one power device to limit a rate of current change (di/dt) during a fault.

44. The device according to claim 41, wherein the current limiter and/or the parasitic inductance component are configured such that a voltage drop across the parasitic inductance component counters a gate voltage increase of the at least one power device.

45. The device according to claim 41, wherein the parasitic inductance component is configured, structured, and/or implemented to limit a rate of current change (di/dt) during a fault.

46. The device according to claim 41, wherein the parasitic inductance component is implemented as a printed circuit board (PCB) trace.

47. The device according to claim 41, wherein the parasitic inductance component is implemented as a copper plate.

48. The device according to claim 41, wherein the parasitic inductance component has an inductance of less than 100 nH.

49. The device according to claim 41, wherein the parasitic inductance component has an inductance of 5 nH to 100 nH.

50. The device according to claim 41, wherein the parasitic inductance component is configured as a metallic trace, a metallic plate, a metallic coil, and/or a spiral metallic configuration.

51. The device according to claim 41, wherein the parasitic inductance component is structured and arranged on a circuit substrate, in or with the current sensor, and/or in or on a printed circuit board.

52. The device according to claim 41, wherein the parasitic inductance component is part of the current sensor implemented as a current shunt.

53. The device according to claim 41, wherein the parasitic inductance component and the current sensor are configured as separate components.

54. The device according to claim 41, wherein the current sensor and the parasitic inductance component are integrated.

55. The device according to claim 41, wherein the current sensor comprises the parasitic inductance component.

56. The device according to claim 41, wherein the parasitic inductance component is the current sensor implemented as a current shunt.

57. The device according to claim 41, wherein the current sensor is implemented as a shunt resistor.

58. The device according to claim 41, further comprising:
at least one second power device;
a second current sensor; and
a second parasitic inductance component,
wherein the second parasitic inductance component is configured, structured, and/or implemented to limit a rate of current change (di/dt) during a fault.

* * * * *